(12) United States Patent
Lee

(10) Patent No.: US 9,843,618 B2
(45) Date of Patent: Dec. 12, 2017

(54) METHOD AND APPARATUS FOR DISPLAYING USER INTERFACE THROUGH SUB DEVICE THAT IS CONNECTABLE WITH PORTABLE ELECTRONIC DEVICE

(71) Applicant: Samsung Electronics Co., Ltd., Suwon-si, Gyeonggi-do (KR)

(72) Inventor: Yang-Don Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 14/272,814

(22) Filed: May 8, 2014

(65) Prior Publication Data

US 2014/0337748 A1 Nov. 13, 2014

(30) Foreign Application Priority Data

May 9, 2013 (KR) .................. 10-2013-0052248

(51) Int. Cl.
*G06F 3/0482* (2013.01)
*H04L 29/08* (2006.01)
(Continued)

(52) U.S. Cl.
CPC ............ *H04L 67/025* (2013.01); *G06F 3/038* (2013.01); *G06F 3/04847* (2013.01); *G06F 3/04883* (2013.01); *G06F 3/1423* (2013.01); *G06F 3/1454* (2013.01); *H04M 1/7253* (2013.01); *G06F 2203/0384* (2013.01); *G09G 2340/145* (2013.01); *H04L 67/38* (2013.01); *H04M 2250/22* (2013.01)

(58) Field of Classification Search
None
See application file for complete search history.

(56) References Cited

U.S. PATENT DOCUMENTS 5,309,555 A * 5/1994 Akins ................. H04L 12/1813
715/756
5,481,665 A * 1/1996 Okada ................... G06F 9/4443
715/745

(Continued)

FOREIGN PATENT DOCUMENTS

CN 102209961 A 10/2011
CN 102760041 A 10/2012
(Continued)

OTHER PUBLICATIONS

Chinese Office Action dated Oct. 11, 2017, issued in the Chinese Application No. 201480025180.7.

*Primary Examiner* — Phenuel Salomon
(74) *Attorney, Agent, or Firm* — Jefferson IP Law, LLP

(57) ABSTRACT

A method and apparatus for displaying a User Interface (UI) in a portable electronic device through a sub device is provided. The method includes sensing, by the portable electronic device, an input corresponding to displaying of a popup menu, which is provided by an application, on the sub device, transmitting UI configuration information corresponding to the popup menu to the sub device, receiving, from the sub device, user input data corresponding to a user input sensed on the popup menu that is displayed on the sub device, and controlling execution of the application in response to the received user input data.

16 Claims, 36 Drawing Sheets

(51) Int. Cl.
*G06F 3/038* (2013.01)
*G06F 3/0488* (2013.01)
*G06F 3/0484* (2013.01)
*G06F 3/14* (2006.01)
*H04M 1/725* (2006.01)
*H04L 29/06* (2006.01)

(56) References Cited

U.S. PATENT DOCUMENTS

| | | | |
|---|---|---|---|
| 8,271,893 B1* | 9/2012 | Tighe | 345/619 |
| 8,953,208 B2* | 2/2015 | Furukawa | H04N 1/00307 |
| | | | 358/1.13 |
| 2002/0151283 A1* | 10/2002 | Pallakoff | G06F 3/14 |
| | | | 455/575.1 |
| 2007/0132860 A1* | 6/2007 | Prabhu | H04N 5/232 |
| | | | 348/231.3 |
| 2010/0060549 A1 | 3/2010 | Tsern | |
| 2010/0118115 A1* | 5/2010 | Takahashi | H04N 1/00291 |
| | | | 348/24 |
| 2010/0222110 A1* | 9/2010 | Kim | G06F 1/1616 |
| | | | 455/566 |
| 2010/0227642 A1* | 9/2010 | Kim | H04M 1/72575 |
| | | | 455/556.1 |
| 2011/0164058 A1* | 7/2011 | Lemay | G06F 3/0488 |
| | | | 345/651 |
| 2011/0183719 A1* | 7/2011 | Baek | H04M 1/72527 |
| | | | 455/566 |
| 2011/0197155 A1 | 8/2011 | Lee et al. | |
| 2012/0092253 A1 | 4/2012 | Irani et al. | |
| 2012/0274581 A1 | 11/2012 | Kim | |
| 2012/0308209 A1* | 12/2012 | Zaletel | G11B 27/034 |
| | | | 386/278 |
| 2013/0050238 A1* | 2/2013 | Bergou | H04N 1/62 |
| | | | 345/589 |
| 2013/0094829 A1* | 4/2013 | Yang | G11B 27/34 |
| | | | 386/230 |
| 2013/0120439 A1* | 5/2013 | Harris | G11B 27/034 |
| | | | 345/619 |
| 2013/0162515 A1* | 6/2013 | Prociw | G06F 1/1616 |
| | | | 345/156 |
| 2013/0167086 A1* | 6/2013 | Kim | G06T 11/60 |
| | | | 715/810 |
| 2013/0219303 A1* | 8/2013 | Eriksson | G06F 3/1454 |
| | | | 715/759 |

FOREIGN PATENT DOCUMENTS

| | | |
|---|---|---|
| CN | 102763073 A | 10/2012 |
| KR | 10-0782064 B1 | 12/2007 |
| KR | 10-2011-0087006 A | 8/2011 |
| KR | 10-2012-0036693 A | 4/2012 |
| WO | 2010/148483 A1 | 12/2010 |

* cited by examiner

METHOD AND APPARATUS FOR DISPLAYING USER INTERFACE THROUGH SUB DEVICE THAT IS CONNECTABLE WITH PORTABLE ELECTRONIC DEVICE

CROSS-REFERENCE TO RELATED APPLICATION(S)

This application claims the benefit under 35 U.S.C. §119 (a) of a Korean patent application filed on May 9, 2013 in the Korean Intellectual Property Office and assigned Serial number 10-2013-0052248, the entire disclosure of which is hereby incorporated by reference.

TECHNICAL FIELD

The present disclosure relates to providing of a User Interface (UI) of a portable electronic device. More particularly, the present disclosure relates to a method and apparatus for displaying a UI in a portable electronic device through a sub device.

BACKGROUND

Portable electronic devices are small-size devices developed for facilitating users' needs and are implemented in various forms such as Personal Digital Assistants (PDAs), video players, tablet Personal Computers (PCs), smart phones, and so forth. In particular, the smart phones have a call function and, as needed by users, various applications may be downloaded and installed into the smart phones, such that the smart phones have become popular.

The biggest advantage of a portable electronic device is high portability because the portable electronic device has a small size when compared to an existing computing device such as a desktop computer or a laptop computer. However, due to this advantage, a display of the portable electronic device inevitably is limited in size. To overcome the restriction, recent portable electronic devise are equipped with a touch screen in which a display and an input means are integrated. Nevertheless, users still experience the inconvenience of having to use various applications on a small display screen of the portable electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for displaying a User Interface (UI) in a portable electronic device.

Another aspect of the present disclosure is to provide a method and apparatus for displaying a UI in a portable electronic device through a sub device.

Another aspect of the present disclosure is to provide a method and apparatus for displaying an input screen generated by execution of an application in a portable electronic device through a sub device.

Another aspect of the present disclosure is to provide a method and apparatus for displaying a popup menu in a portable electronic device through a sub device.

Another aspect of the present disclosure is to provide a method and apparatus for sensing a user input in a portable electronic device through a sub device.

In accordance with an aspect of the present disclosure, a display method using a sub device connectable with a portable electronic device is provided. The display method includes sensing, by the portable electronic device, an input corresponding to displaying of a popup menu, which is provided by an application, on the sub device, transmitting UI configuration information corresponding to the popup menu to the sub device, receiving, from the sub device, user input data corresponding to a user input sensed on the popup menu that is displayed on the sub device, and controlling execution of the application in response to the received user input data.

In accordance with another aspect of the present disclosure, a method for displaying a popup menu, which is displayable on a portable electronic device, on a sub device is provided. The method includes receiving UI configuration information corresponding to a popup menu provided by an application of the portable electronic device from the portable electronic device, in response to reception of the UI configuration information, displaying the popup menu on a display screen of the sub device, sensing a user input on the popup menu displayed on the sub device, and transmitting user input data corresponding to the sensed user input to the portable electronic device.

In accordance with another aspect of the present disclosure, a portable electronic device for displaying a popup menu through a sub device is provided. The portable electronic device includes a display screen configured to display information generated by an application that is being executed, a controller configured to sense an input corresponding to displaying of a popup menu, which is provided by the executed application, on the sub device, generate UI configuration information corresponding to the popup menu, and control execution of the application in response to a user input sensed on the popup menu, and a communication unit configured to transmit the UI configuration information to the sub device and receive user input data from the sub device corresponding to the user input sensed on the popup menu that displayed on the sub device.

In accordance with another aspect of the present disclosure, a sub device for displaying a popup menu that is displayable on a portable electronic device is provided. The sub device includes a display screen, a communication unit configured to receive UI configuration information corresponding to a popup menu provided in an application of the portable electronic device from the portable electronic device and transmit user input data corresponding to a user input sensed on the popup menu to the portable electronic device, and a controller configured to display the popup menu on the display in response to reception of the UI configuration information and generate the user input data corresponding to the sensed user input if sensing the user input on the popup menu displayed on the sub device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
FIG. 1 illustrates a connection between a portable electronic device and a sub device according to an embodiment of the present disclosure.

FIG. 1 illustrates a connection between a portable electronic device and a sub device according to an embodiment of the present disclosure.

Referring to FIG. 1, a portable electronic device 100 and a sub device 110 may be connected to each other through a wireless communication link or a wired cable. The portable electronic device 100 may be connected with the sub device 110 through a wireless link such as Bluetooth®, Bluetooth Low Energy (BLE), Zigbee, infrared communication, Wireless-Fidelity (Wi-Fi) Direct, home Radio Frequency (RF), Digital Living Network Alliance (DLNA), or the like. In another embodiment, the portable electronic device 100 may be connected with the sub device 110 through a wired technique such as a High-Definition Multimedia Interface (HDMI) cable, a Universal Serial Bus (USB) cable, a micro/mini USB cable, an Audio-Video (AV) cable, or the like.

The portable electronic device 100 is configured to execute a stored or downloaded application with its equipped display, and may be implemented as a Personal Digital Assistant (PDA), a cellular phone, a smart phone, a tablet PC, a Portable Multimedia Player (PMP), or the like. When the portable electronic device 100 is connected and synchronized with the sub device 100 in a wired or wireless manner, upon activation of use of a sub User Interface (UI) mode that displays information through the sub device 110, the portable electronic device 100 transmits UI data to the sub device 110 for the application that is being executed (or the running application).

In the present disclosure, the sub device 110 may display a popup window or a popup menu corresponding to the application executed in the portable electronic device 100. The sub device 110 has a smaller display than a display of the portable electronic device 100 and has a high portability and user accessibility and may be, for example, a wrist watch, an earset remote controller having a display means, or a wearable device attached to or worn on a user's body. Herein, the wrist watch may be a smart watch having a communication function such as Bluetooth® to support notification of a text, a call, or an instant message through interaction with a smart phone.

In the present disclosure, a popup window refers to a new window that is displayed in a popup manner to display specific contents in the running application. If the popup window is configured to sense a user's input into the application, the popup window may be referred to as a popup menu. The popup menu may be configured to not be displayed on a work region of the running application, to display information needed by the user in response to a command from the application, and to receive input of the command from the user. The popup menu is a type of context menu that provides a Graphic User Interface (GUI) for user interaction such as a touch or a motion. The popup menu may be displayed on a screen on user's demand without obstructing the work region of the application. One or more soft keys associated with one or more functions may be included in the popup menu.

In the present disclosure described below, most information generated by the application is displayed on the portable electronic device and at the same time, some information generated by a user's or application's need is displayed on a display screen of the sub device instead of the portable electronic device. Herein, the information displayed on the sub device may include a popup window or a popup menu of the application. Hereinafter, a detailed operation of executing the popup menu and displaying the popup menu on the sub device will be described.

Figure 2:
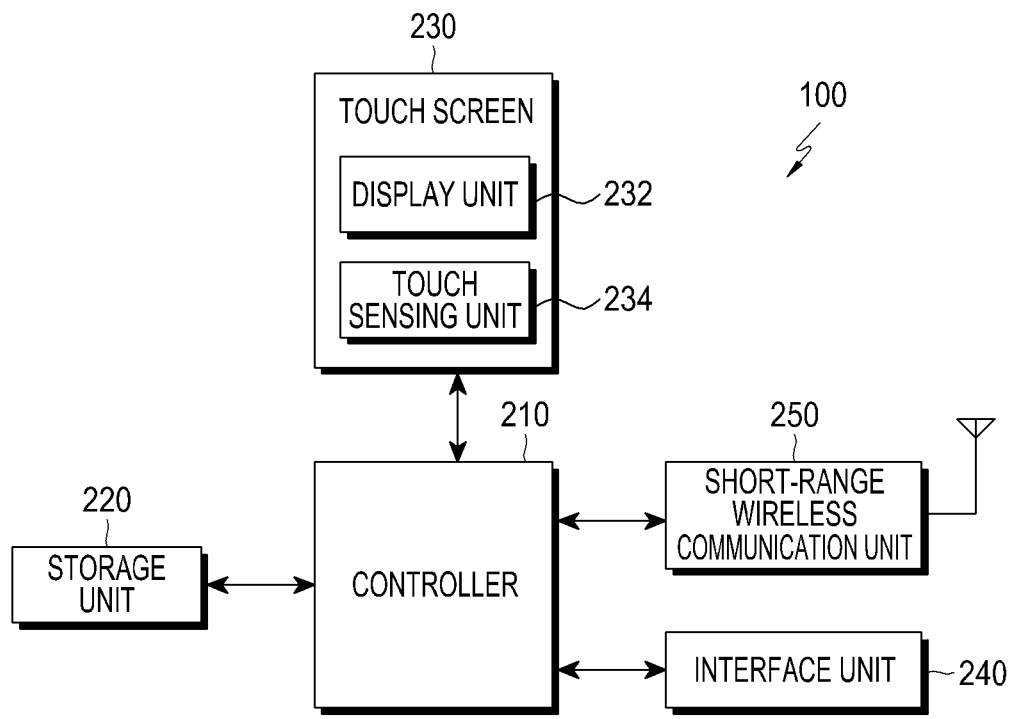
FIG. 2 is a block diagram of a portable electronic device according to an embodiment of the present disclosure.

FIG. 2 is a block diagram of a portable electronic device according to an embodiment of the present disclosure.

Referring to FIG. 2, the portable electronic device 100 may include a short-range wireless communication unit 250, an interface unit 240, a touch screen 230, a storage unit 220, and a controller 210. The touch screen 230 may include a display unit 232 and a touch sensing unit 234, The short-range wireless communication unit 250 may form a short-range wireless communication channel with other electronic devices within a communication range. In particular, the short-range wireless communication unit 250 forms a short-range wireless communication channel with the sub device 110 in a sub UI mode, transmits UI configuration information to the sub device 110 through the short-range wireless communication channel, and receives user input data from the sub device 110 through the short-range wireless communication channel. The short-range wireless communication unit 150 may use a short-range communication scheme such as Bluetooth®, infrared communication, Wi-Fi Peer-to-Peer (P2P), Wi-Fi Direct, home RF, DLNA, or a Zigbee.

The interface unit 240 may include a wired cable for wired connection with the sub device 110, transmits UI configuration information through the wired cable, and receives user input data from the sub device 110 through the wired cable. To this end, the interface unit 240 may be formed with a USB, a micro/mini USB, an HDMI, or a 20-pole connector. If the portable electronic device 100 does not provide a sub UI through the wired cable, the interface unit 240 may be omitted.

The touch screen 230 may perform an input function and an output function. To this end, the touch screen 230 may include the display 232 that performs the output function and the touch sensing unit 234 that performs the input function. The display 232 displays information that is input by the user and/or information to be provide to the user as well as information of the running application in the portable electronic device 100. For example, the display 232 may provide work regions of various applications corresponding to the use of the portable electronic device 100, such as an image editing application, a note program, a photo viewer, a game, and the like. If a popup menu that at least partially obstructs a work region, the controller 210 displays the popup menu on the sub device 110 instead of the display 232. For example, if displaying of a popup menu for brush setting is needed during execution of the image editing application, the controller 210 configures UI configuration information including the popup menu and transmits the UI configuration information to the sub device 110 through the short-range wireless communication unit 250.

The touch sensing unit 234 generates an input event corresponding to a contact or sensing of a user's finger or a stylus and delivers the generated input event to the controller 210. The touch sensing unit 234 recognizes a change in physical quantity (for example, a capacitance, a resistance, and the like) corresponding to a contact or approach of the finger or the stylus, and delivers an input event including a type of an input and information about a position in which the input is sensed to the controller 210.

The storage unit 220 stores user data and program codes needed for operations according to an embodiment of the present disclosure. For example, the storage 220 may store a program for controlling the overall operation of the portable electronic device 100, an Operating System (OS) for booting the portable electronic device 100, and applications necessary for additional functions of the portable electronic device 100, for example, a camera function, a sound play function, image editing, image display, video playback, and a short-range wireless communication function. In particular, the storage unit 220 stores UI configuration information related to a popup menu to be displayed on the touch screen 230 and the sub device 110. In an embodiment, the storage 220 stores UI configuration information related to a popup menu in a form that is suitable for a type of the sub device 110, for example, a size, a physical shape such as a square type or a circle type, a resolution, or a size, and provides the UI configuration information to the controller 210 when requested by the controller 210.

The controller 210 controls the overall operation of the portable electronic device 100 and a signal flow between internal components of the portable electronic device 100. In particular, when the sub UI mode is activated and the popup menu is executed, the controller 210 transmits the UI configuration information, which is related to the popup menu that is configured according to the type of the connected sub device 110, to the sub device 110 through the short-range wireless communication unit 250. Upon receiving user input data indicating a user input sensed on the popup menu from the sub device 110 through the short-range wireless communication 250, for example, the controller 210 controls a brush setting displayed on a work region of the display 232 to be changed based on the user input data.

Although not shown in FIG. 2, the portable electronic device 100 may further include components for providing additional functions such as a camera module for capturing an image or video, a broadcast receiving module for broadcast reception, a digital sound source playback module such as an MPEG audio layer-3 (MP3) module, and a proximity sensor module for proximity sensing. These components may be variously changed in line with the convergence trend of digital devices and, thus, the portable electronic device 100 according to embodiments of the present disclosure may further include components that are equivalent to the aforementioned components.

Figure 3:
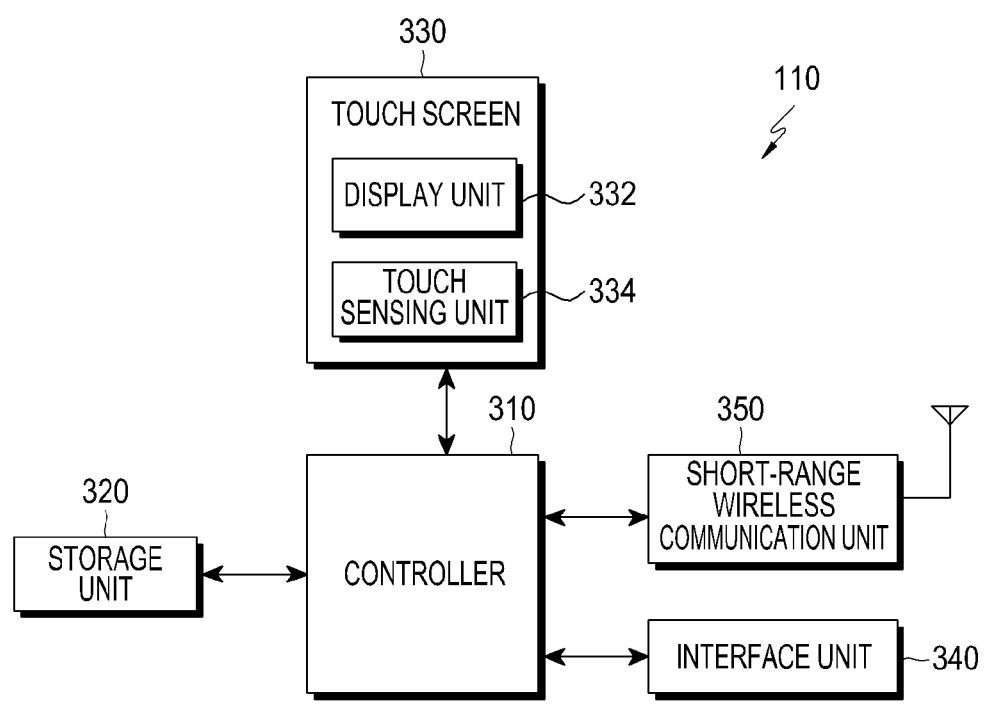
FIG. 3 is a block diagram of a sub device according to an embodiment of the present disclosure.

FIG. 3 is a block diagram of a sub device 110 according to an embodiment of the present disclosure.

Referring to FIG. 3, similar to the portable electronic device 100, the sub device 110 includes a short-range wireless communication unit 350, an interface unit 340, a touch screen 330, a storage unit 320, and a controller 310, and the touch screen 330 includes a display unit 332 and a touch sensing unit 334. The short-range wireless communication unit 350 forms a short-range wireless communication channel with the portable electronic device 100, receives UI configuration information from the portable electronic device 100 through the short-range wireless communication channel, and transmits user input data indicating a sensed user input to the portable electronic device 100 through the short-range wireless communication channel. The interface unit 340 that may selectively exist may include a wired cable for wired connection with the portable electronic device 100, and receives UI configuration information from the portable electronic device 100 through the wired cable and transmits the user input data to the portable electronic device 100 through the wired cable.

The touch screen 330 includes the display 332 for performing the output function and the touch sensing unit 334 for performing the input function, and the display 332 displays information input by the user and/or information to be provided to the user as well as information generated in the sub device 110. For example, if the sub device 110 is a wrist watch, the display 332 may provide a dial face. If UI configuration information related to a popup menu is received from the portable electronic device 100, the controller 310 displays the popup menu on the display 332.

The touch sensing unit 334 generates an input event corresponding to a contact or sensing of a user's finger or a stylus and transmits the generated input event to the controller 310. The touch sensing unit 334 recognizes a change in physical quantity (for example, a capacitance, a resistance, or the like) corresponding to a contact or approach of a finger or a stylus and transmits an input event including a type of an input and information about a position in which the input is sensed to the controller 310. In the sub UI mode, the controller 310 transmits the input event to the portable electronic device 100 through the short-range wireless communication unit 350.

The storage unit 320 stores user data as well as program codes needed to perform functions according to the present disclosure. For example, the storage unit 320 may store a program for controlling the overall operation of the sub device 110, an OS for booting the sub device 110, and program codes necessary for additional functions of the sub device 110, such as a clock function, an alarm function, a notification function, and the like. The storage unit 320 stores UI configuration information necessary for displaying of the popup menu, which is received from the portable electronic device 100. In another embodiment, the storage unit 320 stores information associated with a type of the sub device 110, for example, a size, a physical shape such as a square and a circle, a resolution, or a size, and when requested by the controller 310, the storage 320 provides the information to the controller 310.

The controller 310 controls the overall operation of the sub device 110 and a signal flow between internal components of the sub device 110. In particular, if the sub UI mode is activated and the UI configuration information related to the popup menu is received, the controller 310 displays the popup menu on the display 332. After sensing of a user input on the popup menu from the touch sensing unit 334, the controller 310 generates user input data indicating the user input and transmits the user input data to the portable electronic device 100 through the short-range wireless communication unit 350.

Although not shown in FIG. 3, components for providing additional functions, such as a speaker for outputting an audio signal, a motion sensor, at least one physical input unit such as a rotary or a crown of a wrist watch, and the like may be further provided in the sub device 110. The sub device 110 according to embodiments of the present disclosure may further include components equivalent to the aforementioned components.

By using a portable electronic device and one or more sub devices, the following embodiments separately display, on the sub devices, at least a part of a UI generated by an application that is being executed on the portable electronic device. In an embodiment, a popup menu including a function, such as a color change function or a brush thickness change function, which is frequently used in an image editing application, is displayed on a screen of the sub device, thereby preventing the popup menu from obstructing the work region of the image editing application and reducing the number of manipulations for changing brush setting.

Figure 4:
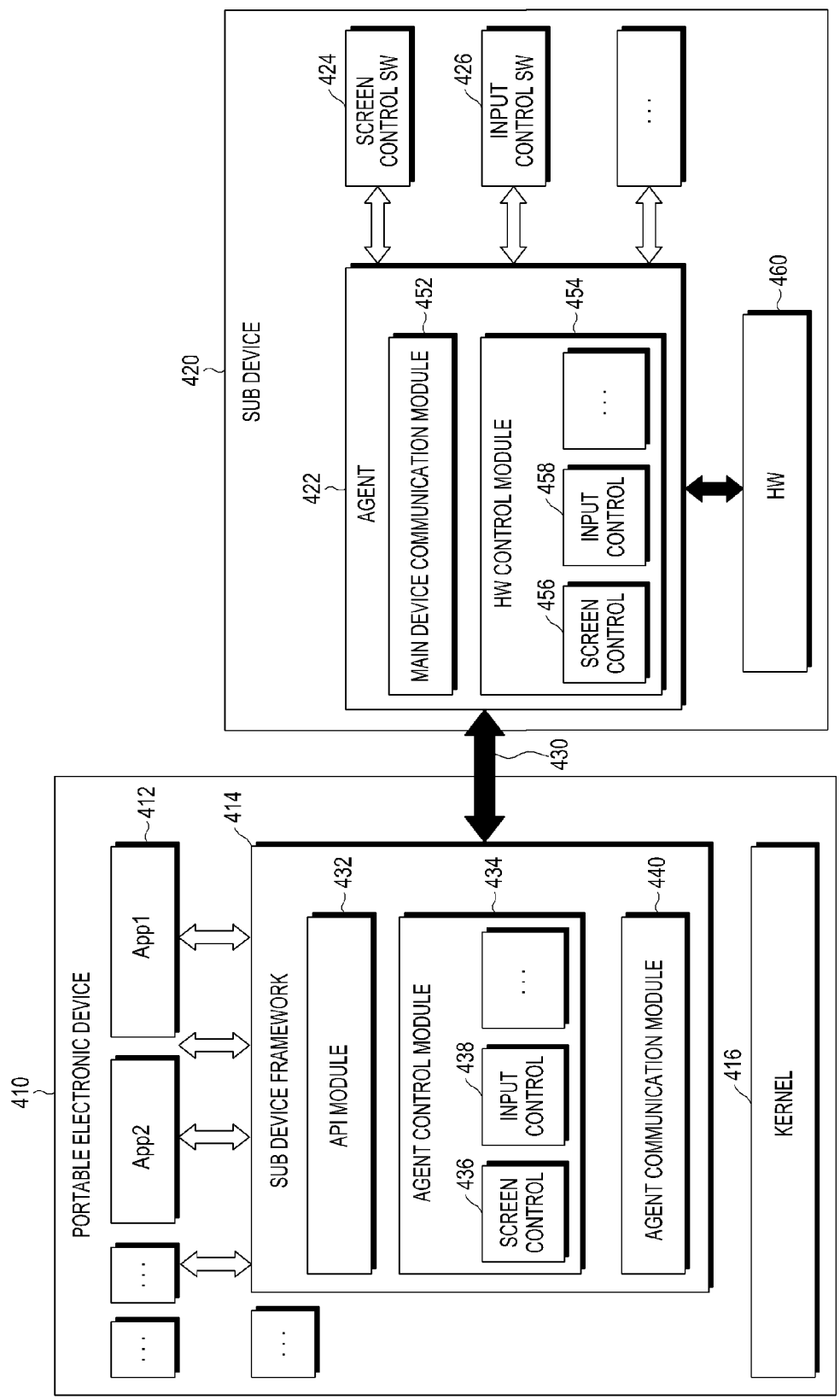
FIG. 4 illustrates connection between a portable electronic device and a sub device according to an embodiment of the present disclosure.

FIG. 4 illustrates connection between a portable electronic device and a sub device according to an embodiment of the present disclosure.

Referring to FIG. 4, a portable electronic device 410 refers to a main device including an application that generates a popup menu, and includes a plurality of executable applications 412 and a framework 414 for a sub device (or a sub device framework 414) operating on a kernel 416. The sub device framework 414 communicates with at least one of the applications 412 and manages communication with a sub device 420. At least one of the applications 412 are programs capable of using the sub device input/output, and may be, for example, an image editing application, a game, or a photo viewer.

The portable electronic device 410 is connected with the sub device 420 by using a wired or wireless communication link 430. The sub device 420 includes an agent program 422 in charge of communication between the portable electronic device 410 and the sub device 420 and one or more software execution units 424 and 426. The software execution units 424 and 426 include screen control software 424 and input control software 426. The screen control software 424 displays information generated in the sub device 420 or UI configuration information provided from the portable electronic device 410 through the agent program 422 on a screen of the sub device 420, and the input control software 426 senses and processes information input through a touch screen or another input unit of the sub device 420 or transfers the information to the portable electronic device 410 through the agent program 422.

The sub device framework 414 in the portable electronic device 410 includes an Application Program Interface (API) module 432 that communicates with the applications 412, an agent control module 434 that configures UI configuration information to be transmitted to the sub device 420 and receives and interprets user input data delivered from the sub device 420, and an agent communication module 440 that is in charge of communication with the agent program 422 of the sub device 420 according to the type of communication link. The agent control module 434 includes a screen control sub module 436 that configures UI configuration information to be transferred to the sub device 422 and delivers the UI configuration information to the sub device 422 through the agent communication module 440. The agent control module 434 also includes an input control sub module 438 that interprets user input data received from the sub device 422 and transfers the user input data to the corresponding application 412.

The API module 432 provides an interface for using resources of the sub device 420, such as screen control, input control, and the like. To this end, the API module 432 uses an agent control module 434 that supports use of the resources (screen output, touch input, and the like) of the sub device 420 through the sub modules 436 and 438 that manage control (screen, touch input, and the like) of the sub device 420. The agent communication module 440 forwards a request of the application 412 to the sub device 420 or forwards a user input from the sub device 420 to the application 412 through the agent control module 434.

The agent program 422 in the sub device 420 includes a main device communication module 452 that communicates with the sub device framework 414 of the portable electronic device 410 and a hardware control module 454 that controls input/output hardware 460 of the sub device 420. The input/output hardware 460 includes output units such as a display or a touch screen and input units such as a touch screen, a motion sensor, and physical buttons. The hardware control module 454 includes a screen control sub module 456 that displays UI configuration information on a display or the touch screen of the input/output hardware 460 and an input control sub module 458 that transfers user input data sensed through the touch screen or another input unit of the input/output hardware 460 to the portable electronic device 410.

The hardware control module 454 receives a request from the portable electronic device 410, configures state and screen information of the sub device 420, and transfers the configured information to the portable electronic device 410. The hardware control module 454 may operate by using a device driver of an OS or directly accessing a hardware register based on a software structure of the sub device 420.

Figure 5:
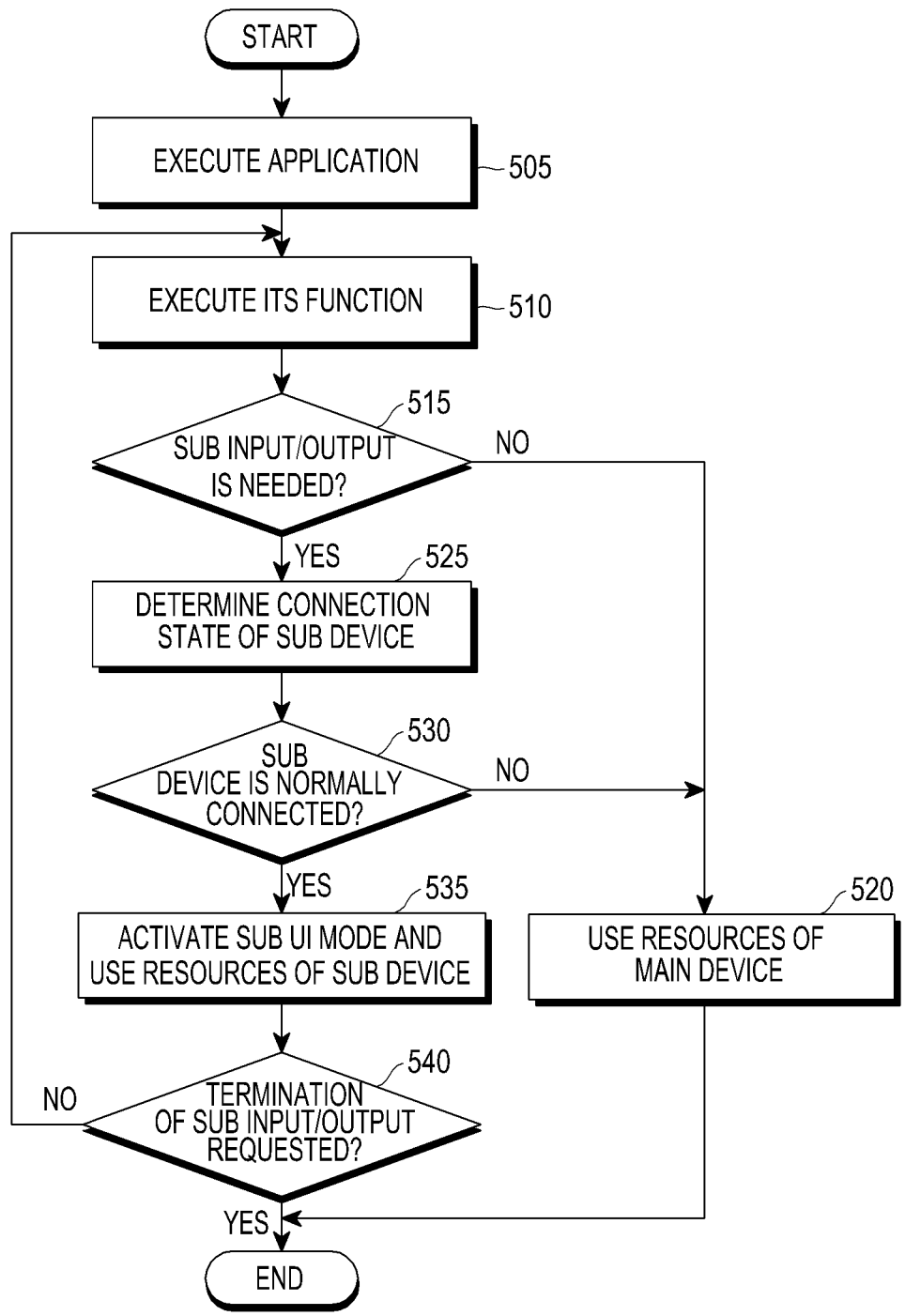
FIG. 5 is a flowchart illustrating a procedure for executing an application according to an embodiment of the present disclosure.

FIG. 5 is a flowchart illustrating a procedure for executing an application according to an embodiment of the present disclosure.

Referring to FIG. 5, the portable electronic device executes an application according to a user input or automatically in operation 505 and performs a function of the application by using resources of the portable electronic device in operation 510. For example, in an image editing application, a work region for editing an image and a menu region for an additional function (a setting menu for brush change, a text input, an erasure, or the like) to be used on the work region are output on a display screen, and a function such as brush change or hand drawing according to a user input is sensed on the display screen of the portable electronic device.

In operation 515, the portable electronic device determines whether use of sub input/output (i.e., a sub UI) is needed for an application upon execution of the application or in response to a user command. In an embodiment, the portable electronic device provides an icon (or a soft key) for requesting use of a sub UI mode through a status bar or a menu region of an application, and if a user input such as a touch or a tap is sensed on the icon for requesting use of a sub UI mode, the portable electronic device determines that the sub UI is to be used. In another embodiment, when a wrist watch is paired to the portable electronic device, upon execution of an application that provides the sub UI mode, the portable electronic device may display a notification window asking the user to use the sub UI mode, for example, a phrase such as "Use the watch as a sub device? Yes/No" or "Display a popup menu on the watch? Yes/No." If a user input through a soft key corresponds to "Yes," the portable electronic device may determine that the sub UI is to be used. In another embodiment, if the wrist watch is paired to the portable electronic device, the portable electronic device may determine that the sub UI is to be automatically used for the application that provides the sub UI mode.

If determining that sub device input/output is needed, the portable electronic device determines a sub device that is connected to the portable electronic device and is available for sub device input/output. More specifically, the portable electronic device may determine whether the sub device is connected to the portable electronic device through an API provided in the sub device framework in operation 525. For example, based on information collected during connection between the portable electronic device and the sub device, the portable electronic device may determine that the sub device is available for sub device input/output if the sub device includes a display screen and an input unit.

In operation 530, the portable electronic device determines whether the sub device is connected with the portable electronic device and connection with the sub device is in a normal state. If the sub device is normally connected to the portable electronic device, the portable electronic device activates a sub UI mode and provides a sub UI through a screen control and input control API provided in the sub device framework. More specifically, the portable electronic device identifies at least a portion of information generated by execution of an application, reconfigures the identified information to be displayed on the sub device, generates UI configuration information indicating the reconfigured information, and transmits the UI configuration information to the sub device. Upon receiving user input data indicating a user input sensed in the sub device, the portable electronic device controls execution of the application in response to the user input. In an embodiment, the at least a portion of the information to be displayed through the sub device may be a popup menu provided by the application, and the UI configuration information includes a popup menu reconfigured to be displayed on the sub device. For example, the work region of the image editing application is displayed on the display of the portable electronic device, whereas the popup menu generated by the application is displayed on the display of the sub device. The user input sensed on the popup menu is transferred to the application of the portable electronic device.

In an embodiment, upon execution of an application that supports the sub UI mode, the portable electronic device determines whether the sub device is connected with the portable electronic device, and if so, the portable electronic device automatically determines that the sub device input/output is to be used.

If determining that the sub input/output is not needed in operation 515 or if the sub device is not normally connected with the portable electronic device in operation 530, then the portable electronic device provides a UI of the application by using its resources in operation 520. In an embodiment, the work region of the image editing application and the popup menu generated when necessary are displayed on the display of the portable electronic device.

In operation 540, the portable electronic device determines whether termination of the sub UI mode is requested. In an embodiment, the portable electronic device provides an icon indicating that the sub UI mode is being used on a menu region of the application or the status bar, and if a user input on the icon is sensed, the portable electronic device determines that termination of the sub UI mode is requested. In another embodiment, when the application is terminated, the portable electronic device determines that termination of the sub UI mode is requested. If termination of the sub UI mode is requested, the portable electronic device notifies the sub device of termination of the sub UI mode, such that the sub device terminates display of the sub UI.

Figure 6A:
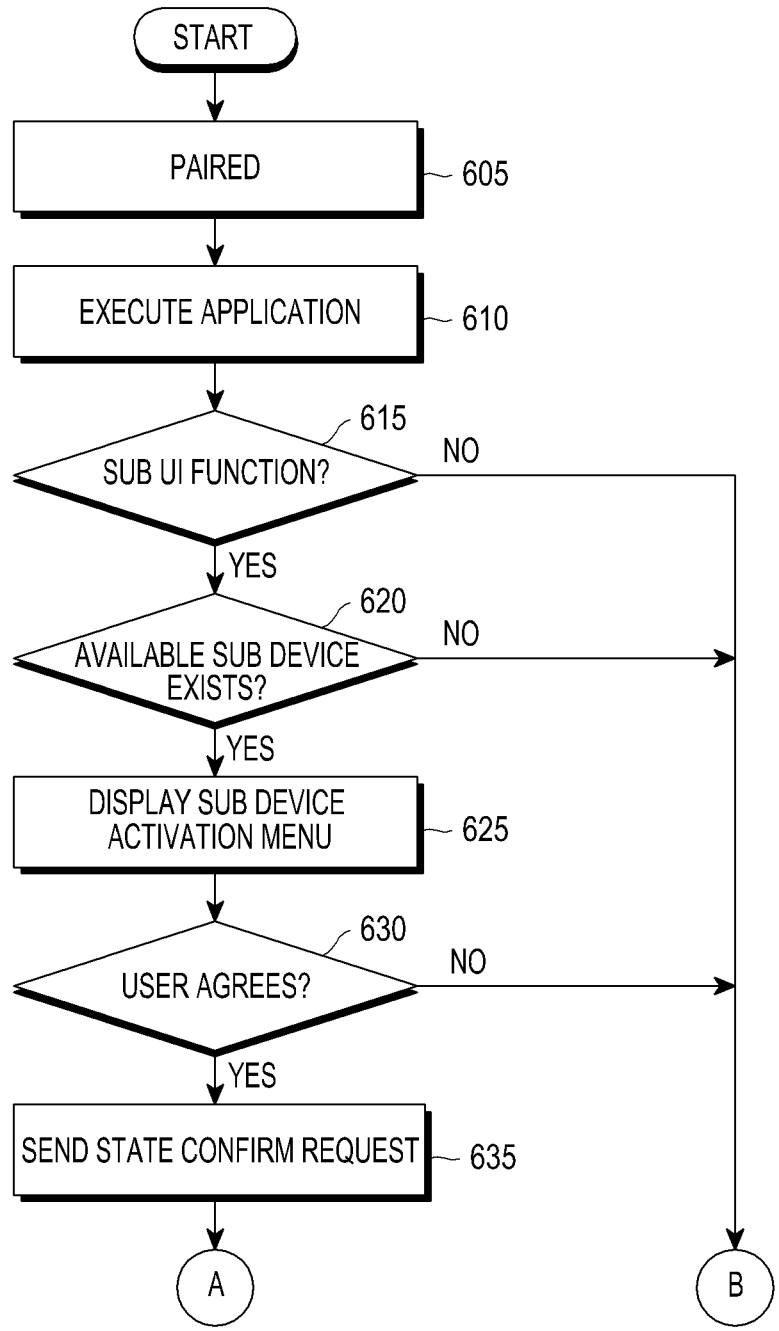
FIGS. 6A and 6B are flowcharts illustrating a sub User Interface (UI) providing operation of a portable electronic device according to an embodiment of the present disclosure.
Figure 6B:
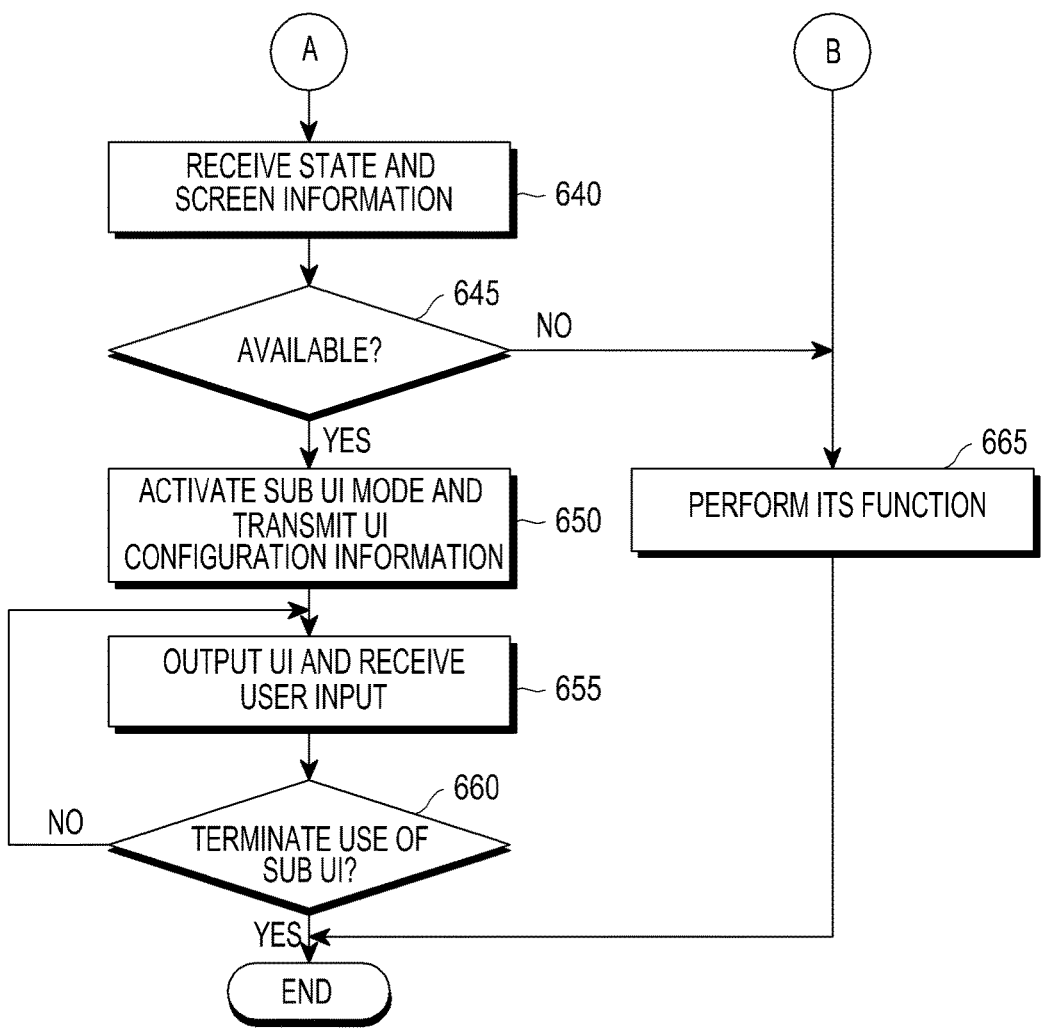

FIGS. 6A and 6B are flowcharts illustrating a sub UI providing operation of a portable electronic device according to an embodiment of the present disclosure.

Referring to FIGS. 6A and 6B, an operation corresponding to a case where the portable electronic device triggers use of a sub UI is illustrated. In operation 605, the portable electronic device recognizes a connectable sub device. In an embodiment, if identifying a password agreed with a sub device and completing mutual authentication with the sub device, the portable electronic device may determine that the sub device is connectable, that is, it can communicate with the sub device. In an embodiment, if Bluetooth® is used for wireless connection with the sub device, the portable electronic device is paired with the sub device by using Bluetooth®. In operation 610, the portable electronic device senses execution of an application. In operation 615, the portable electronic device determines whether the application is capable of using the sub device as a sub UI. If the application provides the sub UI mode, the portable electronic device determines whether a sub device that provides the sub UI is available in operation 620. In an embodiment, the portable electronic device manages a list of sub devices connected to the portable electronic device, identifies types of the sub devices, and determines that a sub device having a display is available as a sub UI. In another embodiment, upon connection with a sub device, the portable electronic device obtains and stores information about whether the sub device is available as a sub UI from the sub device or an Internet server.

If a sub device available as a sub UI exists, the portable electronic device displays an activation notification window for determining whether the user agrees to use the sub UI mode in operation 625. In an embodiment, the portable electronic device outputs a notification window asking to use the sub UI mode. In operation 630, the portable electronic device determines whether the user agrees to use the sub UI mode. If the user agrees to use the sub UI mode, for example, by sensing a user input on the notification window indicating that the user agrees to use the sub UI mode, the portable electronic device goes to operation 635. If the application is configured to use the sub UI mode, operations 625 and 630 may be omitted.

In operation 635, the portable electronic device sends an interaction request for using the sub UI to the sub device. In operation 635, the portable electronic device may establish a connection with the sub device if necessary. In operation 640, at least one of state information and screen information of the sub device is received from the sub device. In an embodiment, the state information may indicate whether the sub device normally operates as the sub UI and/or whether connection between the sub device and the portable electronic device is normal. The screen information may indicate at least one of display shape, size, and resolution of the sub device. In an embodiment, if the portable electronic device may obtain the screen information of the sub device directly from the sub device through prior connection (for example, Bluetooth® pairing) with the sub device or through the Internet server, transmission of the screen information may be omitted. If the portable electronic device desires to receive state and screen information from the sub device, the interaction request of operation 635 may further include an indicator for requesting the state and screen information. For example, the state confirm request of operation 635 includes a message or a packet and includes at least one bit indicating a request for screen and/or state information.

In operation 645, the portable electronic device determines whether the sub device is available as the sub UI based on the state and screen information. If the portable electronic device is available as the sub UI, that is, if the sub device is normally connected and is capable of supporting the sub UI, the portable electronic device activates the sub UI mode to configure (or identify) the sub UI for the application based on the screen information in operation 650, and transmits UI configuration information indicating the sub UI to the sub device. In an embodiment, the portable electronic device configures a popup menu (e.g., a brush setting of the image editing application) as a sub UI and generates UI configuration information. The popup menu includes screen information of the sub device, more specifically, a size, a shape, and a resolution reconfigured according to physical shape or size.

In operation 655, the portable electronic device outputs a UI for a function of the running application on a display screen, and controls execution of the application according to the user input transferred from the sub device. In an embodiment, if the sub device receives user input data including a command related to brush setting, the portable electronic device changes a brush (type, thickness, color, or the like) displayed on the display screen of the portable electronic device according to the user input data. In another embodiment, the user input data received from the sub device includes coordinate information indicating a position in which the user input on the popup menu is sensed, and the portable electronic device identifies a control command indicated by the user input, more specifically, at least one of a brush type, a selected brush color, and a selected brush thickness, based on the configuration of the popup menu in operation 650.

In operation 660, the portable electronic device determines whether to terminate use of the sub UI. In an embodiment, the portable electronic device provides an icon indicating that the sub UI is used through the menu region of the running application or the popup menu displayed on the sub device and determines to terminate use of the sub UI if sensing the user input on the icon. In another embodiment, the portable electronic device may determine to terminate use of the sub UI when the application is terminated. If determining to terminate use of the sub UI, the portable electronic device instructs the sub device to terminate displaying of the sub UI. Unless the sub device is used for other purposes, the portable electronic device may release connection with the sub device. If displaying of the sub UI is terminated without termination of the application, the portable electronic device may display the popup menu on its display screen at the request of the user.

If the application does not provide the sub UI mode or does not need the sub UI mode in operation 615; if the available sub device does not exist in operation 620; if agreement to use the sub UI is not input from the user in operation 630; or if the sub device is not available in operation 645, then the portable electronic device continues performing a function of the application through its display screen in operation 665.

Figure 7:
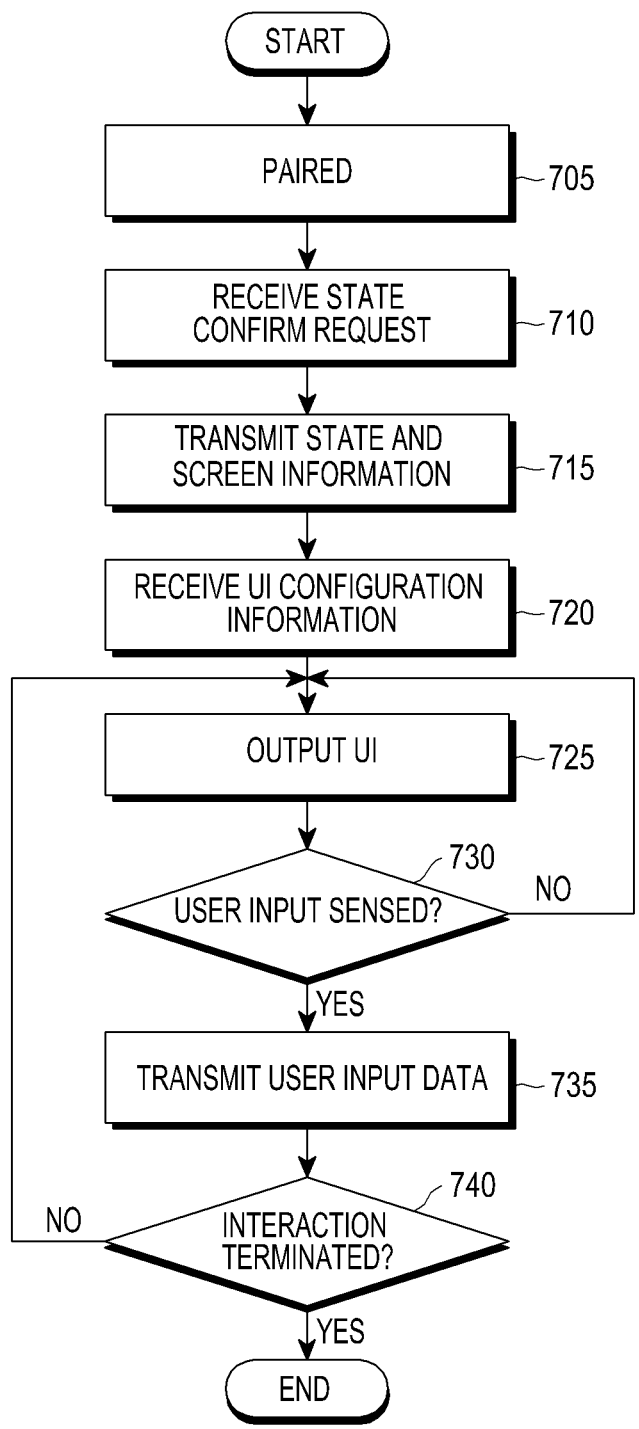
FIG. 7 is a flowchart illustrating a sub User Interface (UI) providing operation using a sub device according to an embodiment of the present disclosure.

FIG. 7 is a flowchart illustrating a sub UI providing operation using a sub device according to another embodiment of the present disclosure.

Referring to FIG. 7, an operation corresponding to a case where the portable electronic device triggers use of the sub UI is illustrated. In operation 705, the sub device recognizes a connectable portable electronic device. In an embodiment, if the sub device identifies a password agreed with the portable electronic device and completes mutual authentication between the portable electronic device and the sub device, the sub device determines that it can communicate with the portable electronic device. In an embodiment, if Bluetooth® is used for wireless connection with the portable electronic device, the sub device is paired with the portable electronic device by using Bluetooth®. The sub device establishes connection with the portable electronic device if necessary and receives a state confirm request from the portable electronic device in operation 710, and transmits at least one of state information and screen information of the sub device to the portable electronic device in operation 715. In an embodiment, the state information indicates whether the sub device may operate normally as the sub UI and/or connection between the sub device and the portable electronic device is normal. The screen information may indicate at least one of display shape, size, and resolution of the sub device. In an embodiment, if the portable electronic device may obtain screen information of the sub device directly from the sub device through prior connection (for example, Bluetooth® pairing) with the sub device or through the Internet server, transmission of the screen information may be omitted.

The sub device receives UI configuration information related to the sub UI from the portable electronic device in operation 720 and outputs the sub UI in operation 725. In an embodiment, the UI configuration information may include a popup menu (e.g., a brush setting of the image editing application running in the portable electronic device) and the popup menu has a size, a shape, and a resolution based on the screen information of the sub device.

In operation 730, the sub device monitors if the user input is sensed on the popup menu, that is, if a user input is received from a touch sensing unit of the sub device. If a user input touch is sensed, the sub device configures user input data indicating the user input and transmits the user input data to the portable electronic device in operation 735. In an embodiment, the user input data may be coordinate information indicating a position in which the user input is sensed on the popup menu. In another embodiment, the user input data may include data related to the application of the portable terminal (e.g., a brush type, a color, and a brush thickness).

In operation 740, the sub device determines whether to terminate interaction with the portable electronic device. In an embodiment, upon receiving a command instructing termination of displaying of the sub UI from the portable electronic device, the sub device terminates displaying of the sub UI. In another embodiment, if the sub device senses a user input for requesting termination of interaction through a popup menu or another soft menu or senses input of a physical button for requesting termination of interaction, the sub device terminates displaying of the sub UI and reports the termination of interaction to the portable electronic device.

Hereinafter, a detail example of interaction between the portable electronic device and the sub device will be described with reference to the accompanying drawings. In the following description, as an example of a popup menu displayed over the work region of the application, the image editing application, a note program for writing, and a word processor driven on the smart phone will be described.

Figure 8:
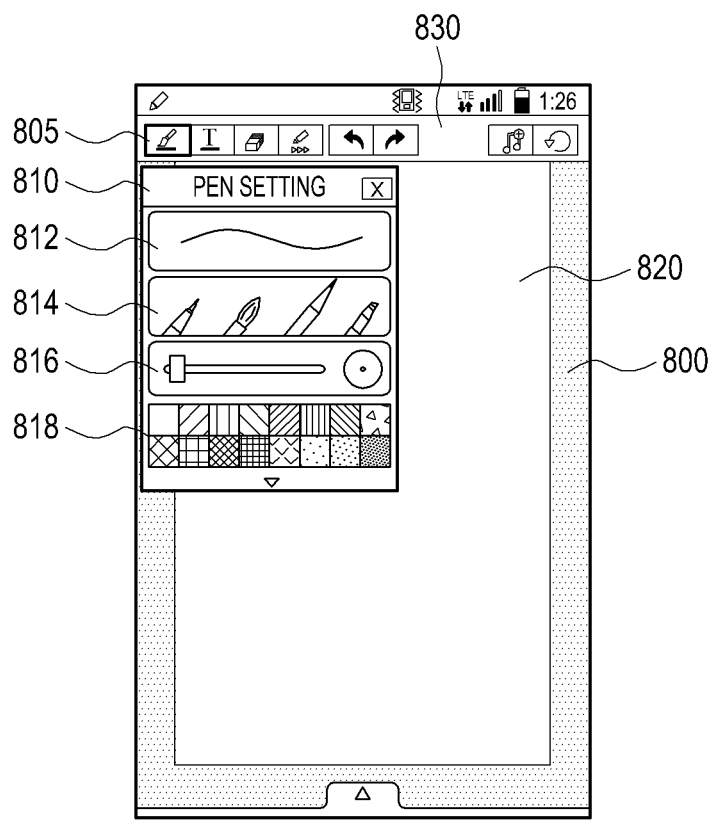
FIG. 8 illustrates an example of a popup menu displayed over a work region of an application according to an embodiment of the present disclosure.

FIG. 8 illustrates an example of a popup menu displayed over a work region of an application according to an embodiment of the present disclosure.

Referring to FIG. 8, an image editing application 800 provides a work region 820 that occupies the most of a screen of the smart phone and has a relatively small menu region 830. The menu region 830 is designed to typically have a minimum size so as not to interrupt user's image editing work on the work region 820. If a user input is sensed on a particular menu item on the menu region 830, for example, a "brush setting" menu 805, the image editing application 800 displays a popup menu 810.

The popup menu 810 may include at least one of a current state region 812 displaying the selected brush type and color, a type selection region 814 for selecting a brush type, a thickness selection region 816 for selecting a brush thickness, and a color selection region 818 for selecting a brush color. Upon sensing a user input on the selection regions 814, 816, and 818, the selected brush shape is displayed on the current state region 812. If the user input is sensed on an external region of the popup menu 810, the popup menu 810 disappears and according to the user input on the work region 820, a hand drawing image using the selected brush is displayed on the work region 820.

If the sub UI mode is activated, the popup menu 810 displayed over the work region 820 may be configured as a sub UI.

FIGS. 9A, 9B, 9C, 9D, 9E, and 9F are diagrams for describing a series of operations for interaction between a portable electronic device and a sub device according to an embodiment of the present disclosure.

Figure 9A:
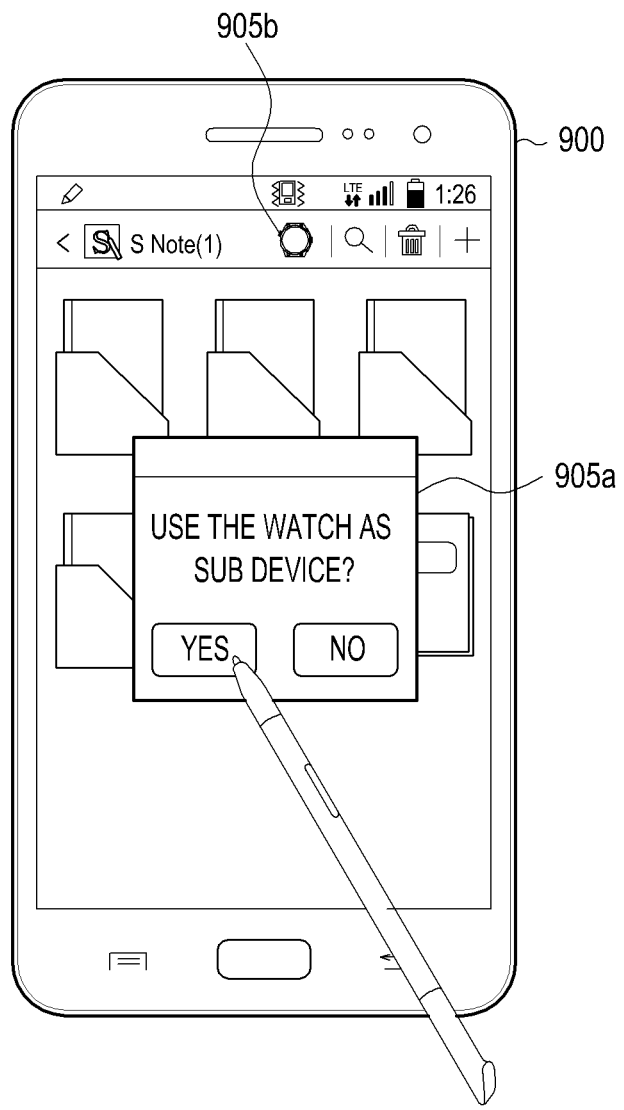
FIGS. 9A, 9B, 9C, 9D, 9E, and 9F are diagrams for describing a series of operations of interaction between a portable electronic device and a sub device according to an embodiment of the present disclosure.

Referring to FIG. 9A, a portable electronic device 900 is implemented with a smart phone that is executing a memo application that includes an image editing function. If a sub device available as a sub UI is connected to the portable electronic device 900 during execution of the memo application, a notification window 905a asking to use the sub UI is displayed on the screen. In an embodiment, the smart phone 900 may display the notification window 905a when an application supporting the sub UI mode is executed. In an embodiment, the smart phone 900 provides a soft key 905b for activating the sub UI upon execution of the memo application and displays the notification window 905a upon sensing a user input such as a touch on the soft key 905b.

If sensing an input for permitting use of the sub UI on the notification window 905b, for example, a touch input on a soft key "Yes," the smart phone 900 sends a state confirm request to the connected sub device that is available as the sub UI.

Figure 9B:
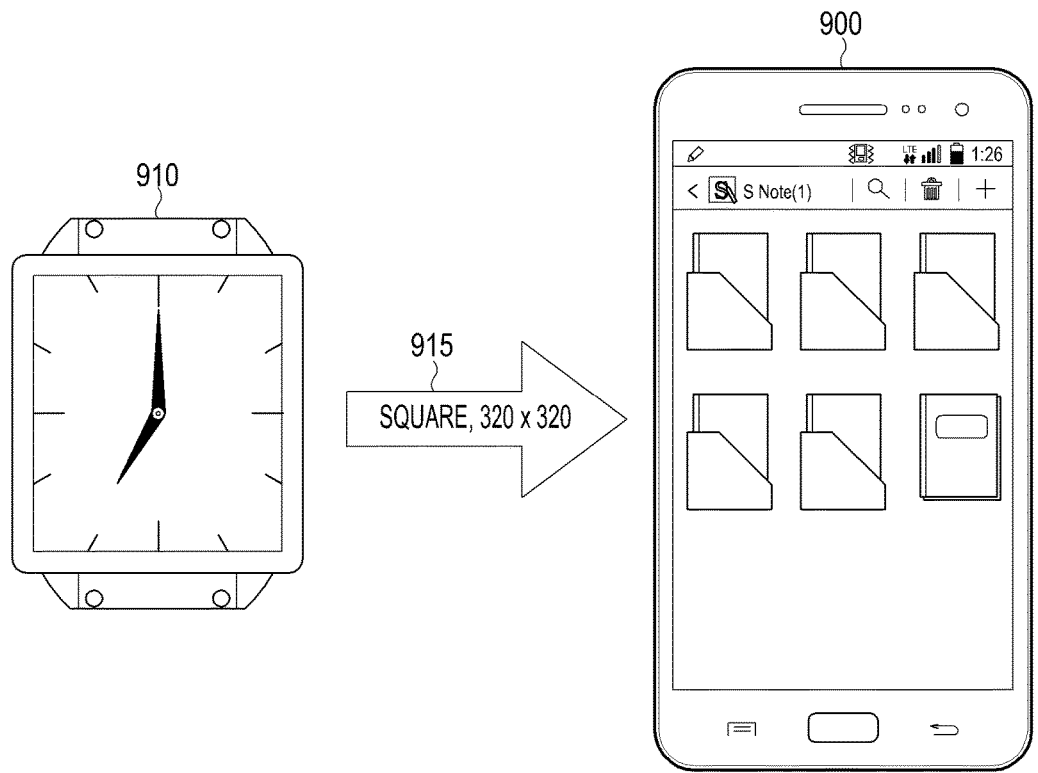

Referring to FIG. 9B, a sub device 910 is implemented as a wrist watch configured to be connected with the portable electronic device in a wired or wireless manner. In response to the state confirm request of the smart phone 900, the sub device 910 provides its state and screen information 915 to the smart phone 900. The screen information 915 may include, for example, "SQUARE" indicating a physical shape of the wrist watch 910 and "320×320" indicating a size (or resolution) of the wrist watch 910.

Figure 9C:
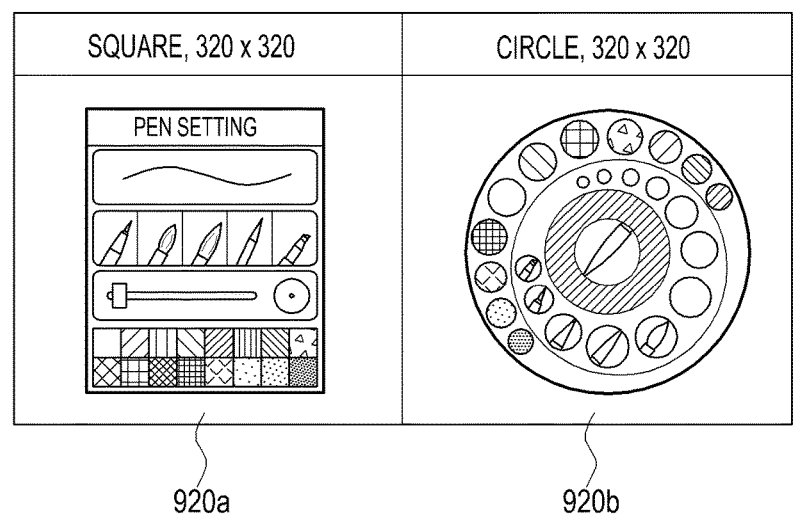

FIG. 9C illustrates examples of the screen information 915. If the wrist watch 910 has a rectangular screen, screen information 920*a* indicates "SQUARE, 320×320." In another example, if the wrist watch 910 has a circular screen, screen information 920*b* indicates "circle, 320×320."

Figure 9D:
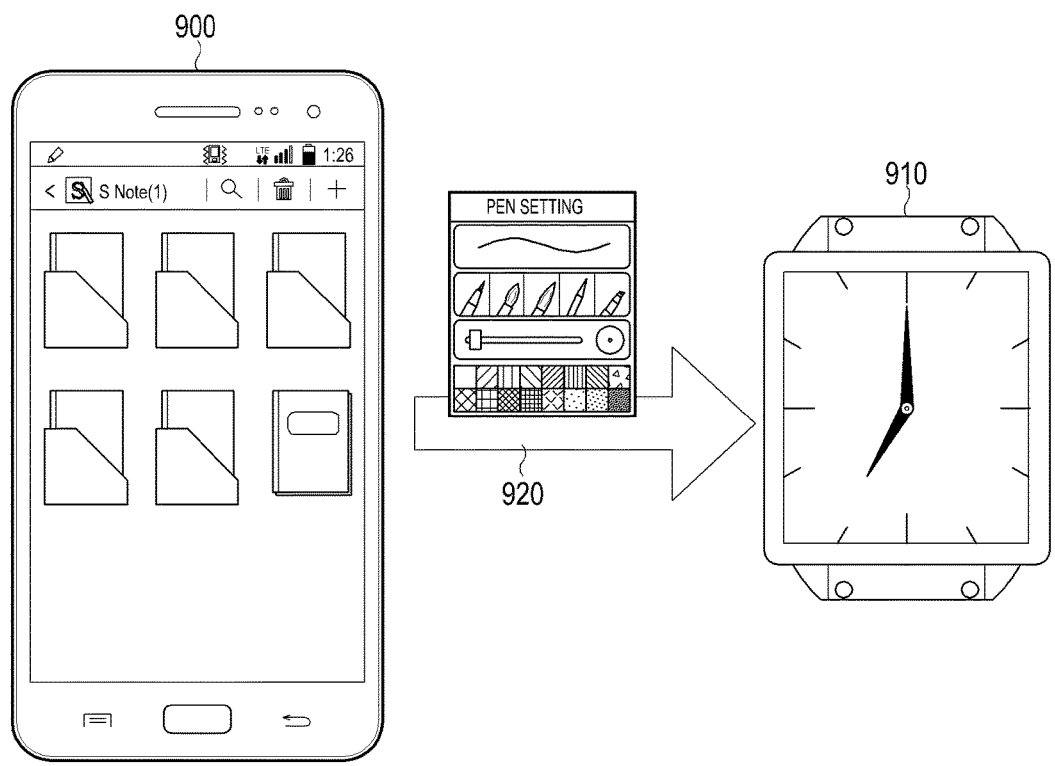
Figure 9E:
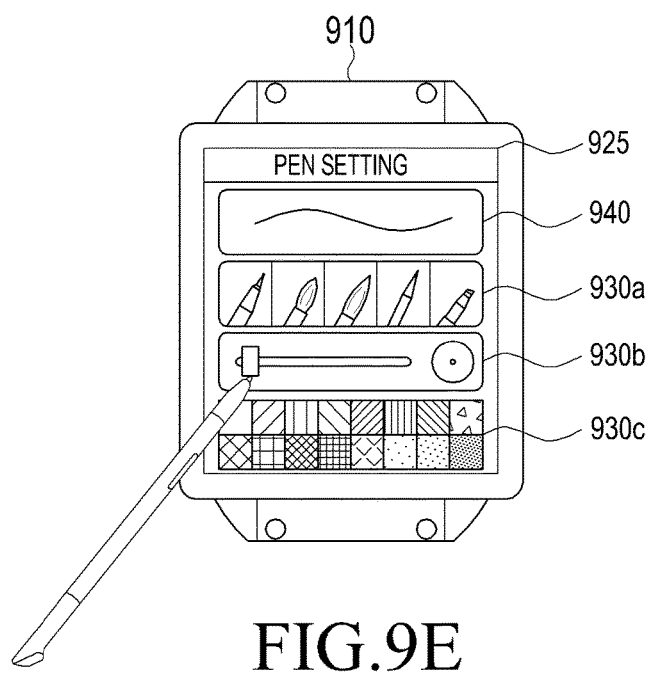

Referring to FIG. 9D, the smart phone 900 transmits, to the wrist watch 910, UI configuration information 920 related to a popup menu that is configured for the screen of the wrist watch 910. Referring to FIG. 9E, the wrist watch 910 displays a popup menu 925 on its screen based on the UI configuration information 920. The popup menu 925 is configured to be suitable for the shape of the screen of the wrist watch 910 and include a type selection region 930*a* for selecting a brush type, a thickness selection region 930*b* for selecting a brush thickness, a color selection region 930*c* for selecting a brush color, and a brush state region 940 indicating a selected brush.

Figure 9F:
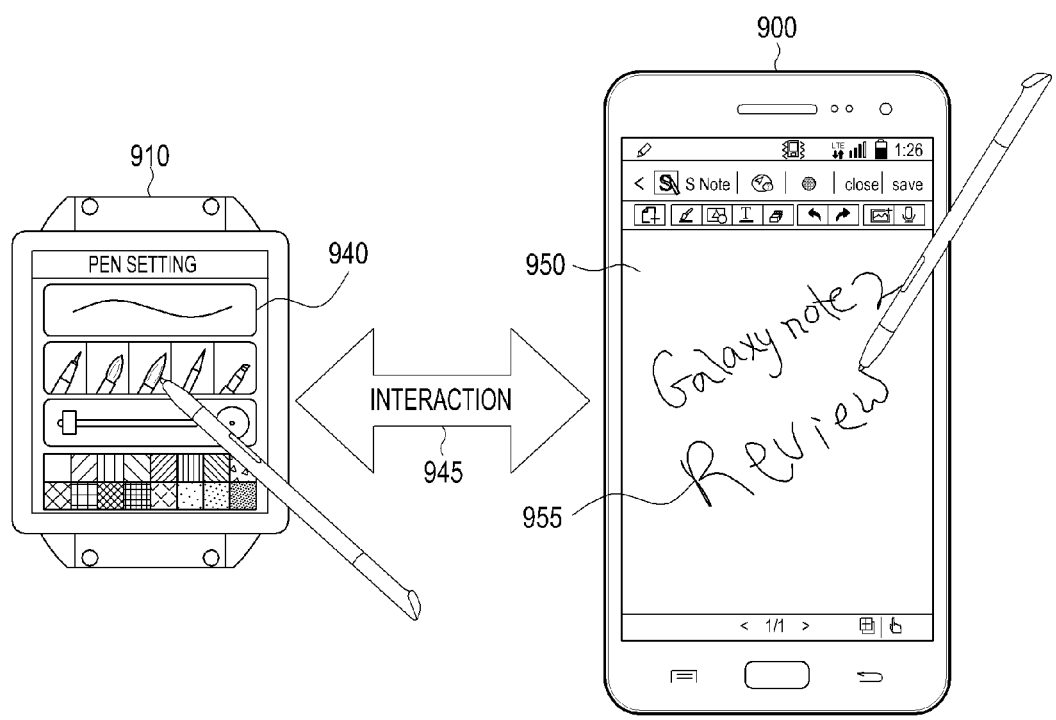

Referring to FIG. 9F, if a user input is sensed on a particular position on the popup menu 925, the brush state region 940 is changed corresponding to the position in which the user input is sensed. For example, if the user input is sensed on a black region in the color selection region 930*c*, the color of the brush state region 940 is changed into black and user input data 945 indicating information about the position in which the user input is sensed from the wrist watch 910 to the smart phone 900. Then, the smart phone 900 calculates and stores a brush color selected according to the user input data 945, and displays a hand-drawn picture 955 in black as the user input moves on a work region 950.

Figure 10:
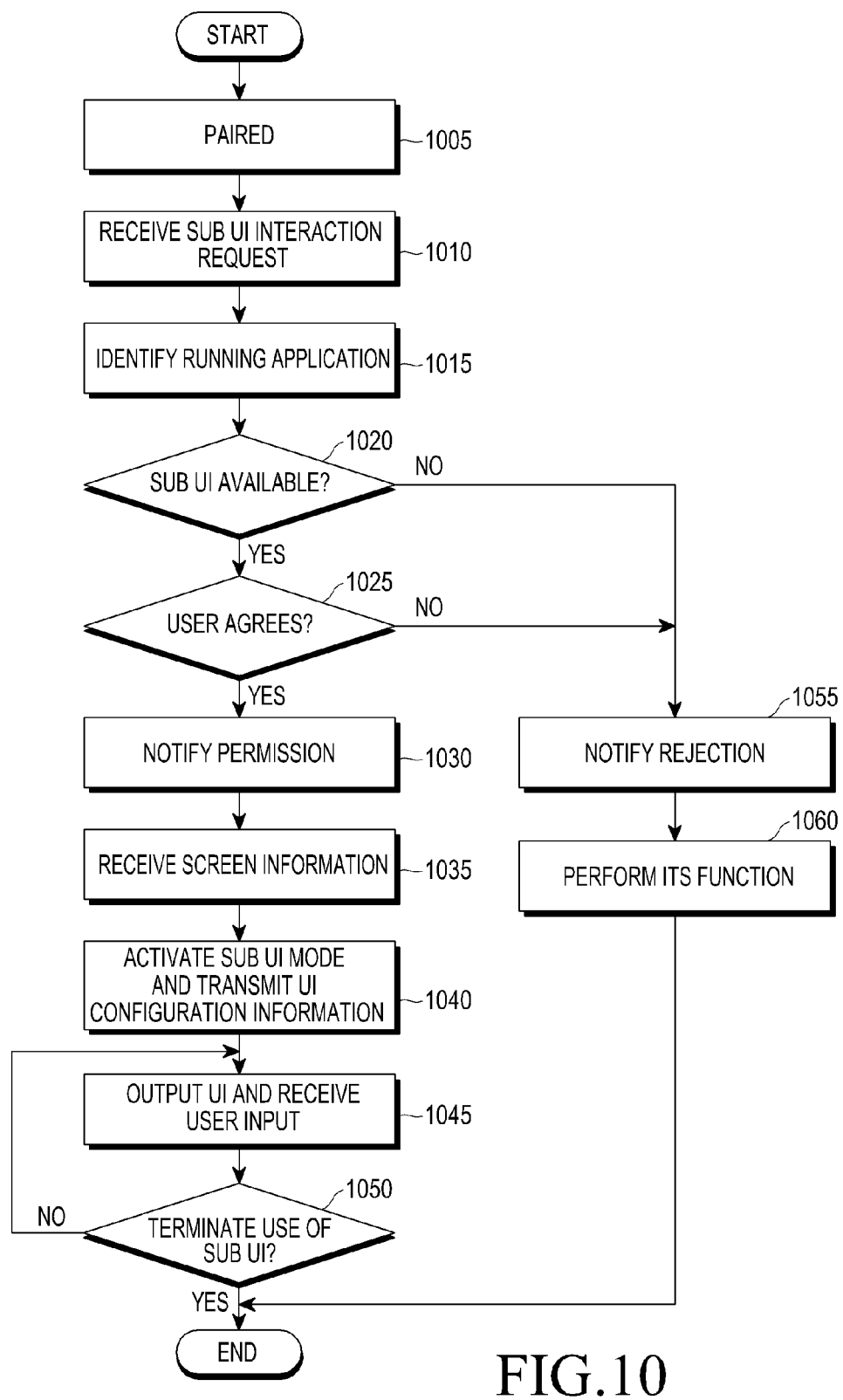
FIG. 10 is a flowchart illustrating a sub UI providing operation of a portable electronic device according to another embodiment of the present disclosure.

FIG. 10 is a flowchart illustrating a sub UI providing operation of a portable electronic device according to another embodiment of the present disclosure.

Referring to FIG. 10, an operation corresponding to a case where a sub device triggers use of the sub UI is illustrated. In operation 1005, the portable electronic device recognizes a connectable sub device. In an embodiment, if identifying a password agreed with a sub device and completing mutual authentication with the sub device, the portable electronic device may determine that it can communicate with the sub device. In an embodiment, if Bluetooth® is used for wireless connection with the sub device, the portable electronic device is paired with the sub device by using Bluetooth®. The portable electronic device receives an interaction request to be used as the sub UI from the sub device in operation 1010 and identifies an application running on the screen in operation 1015.

In operation 1020, the portable electronic device determines whether to provide the sub UI mode for the running application. In an embodiment, if the application generates a popup menu, the portable electronic device may determine to provide the sub UI mode. If the application provides the sub UI mode, the portable electronic device determines whether the user agrees to use the sub UI mode in operation 1025. In an embodiment, the portable electronic device outputs a notification window asking the user if to use the sub UI mode on the screen, and proceeds to operation 1030 a user input indicating that the user agrees to use the sub UI mode is sensed on the notification window.

In operation 1030, the portable electronic device notifies the sub device that interaction for sub input/output is permitted. For the notification, the portable electronic device may establish a connection with the sub device if necessary. If the portable electronic device automatically determines to use the sub UI if the application supports the sub UI, operation 1025 may be omitted, and in this case, the portable electronic device may simply request screen information of the sub device in operation 1030.

In operation 1035, the portable electronic device receives screen information from the sub device indicating at least one of a display shape, a size, and a resolution of the sub device. In an embodiment, if the portable electronic device may obtain the screen information of the sub device directly from the sub device through prior connection (for example, Bluetooth® pairing) with the sub device or through the Internet server (for example, a server of a manufacturer of the sub device), operation 1035 may be omitted.

In operation 1040, the portable electronic device activates the sub UI mode to configure (or identify) the sub UI for the running application based on the screen information, and transmits UI configuration information related to the sub UI to the sub device. In an embodiment, the UI configuration information may include a popup menu (e.g., a brush setting of an image editing application) and the popup menu has a size, a shape, and a resolution based on the screen information of the sub device.

In operation 1045, the portable electronic device outputs a UI for a function of the running application on its display screen, and controls execution of the application according to a user input on the sub device. In an embodiment, upon receiving user input data related to brush setting from the sub device, the portable electronic device changes a brush (type, thickness, color, and so forth) displayed on its display screen. In another embodiment, the user input data received from the sub device includes coordinate information indicating a position in which the user input on the popup menu is sensed, and the portable electronic device identifies at least one of a control command indicated by the user input, a brush type, a selected brush color, and a selected brush thickness based on the configuration of the popup menu in operation 1040.

In operation 1050, the portable electronic device determines whether to terminate use of the sub UI. In an embodiment, the portable electronic device provides an icon indicating that the sub UI is being used on a menu region of the running application or on the popup menu that is being displayed on the sub device, and determines to terminate use of the sub UI the user input is sensed on the icon. In another embodiment, upon termination of the application, the portable electronic device may determine to terminate use of the sub UI. If determining to terminate use of the sub UI, the portable electronic device instructs the sub device to terminate displaying of the sub UI. Unless the sub device is used for other purposes, the portable electronic device may release connection with the sub device. If displaying of the sub UI is terminated without termination of the application, the portable electronic device may display the popup menu on its display screen at the request of the user.

If determining that the running application is not available as the sub UI in operation 1020 or unless sensing a user input indicating that the user agrees to use sub input/output in operation 1025, the portable electronic device notifies the sub device that interaction for sub input/output is rejected in operation 1055 and continues performing the function of the application on its display screen in operation 1060.

Figure 11:
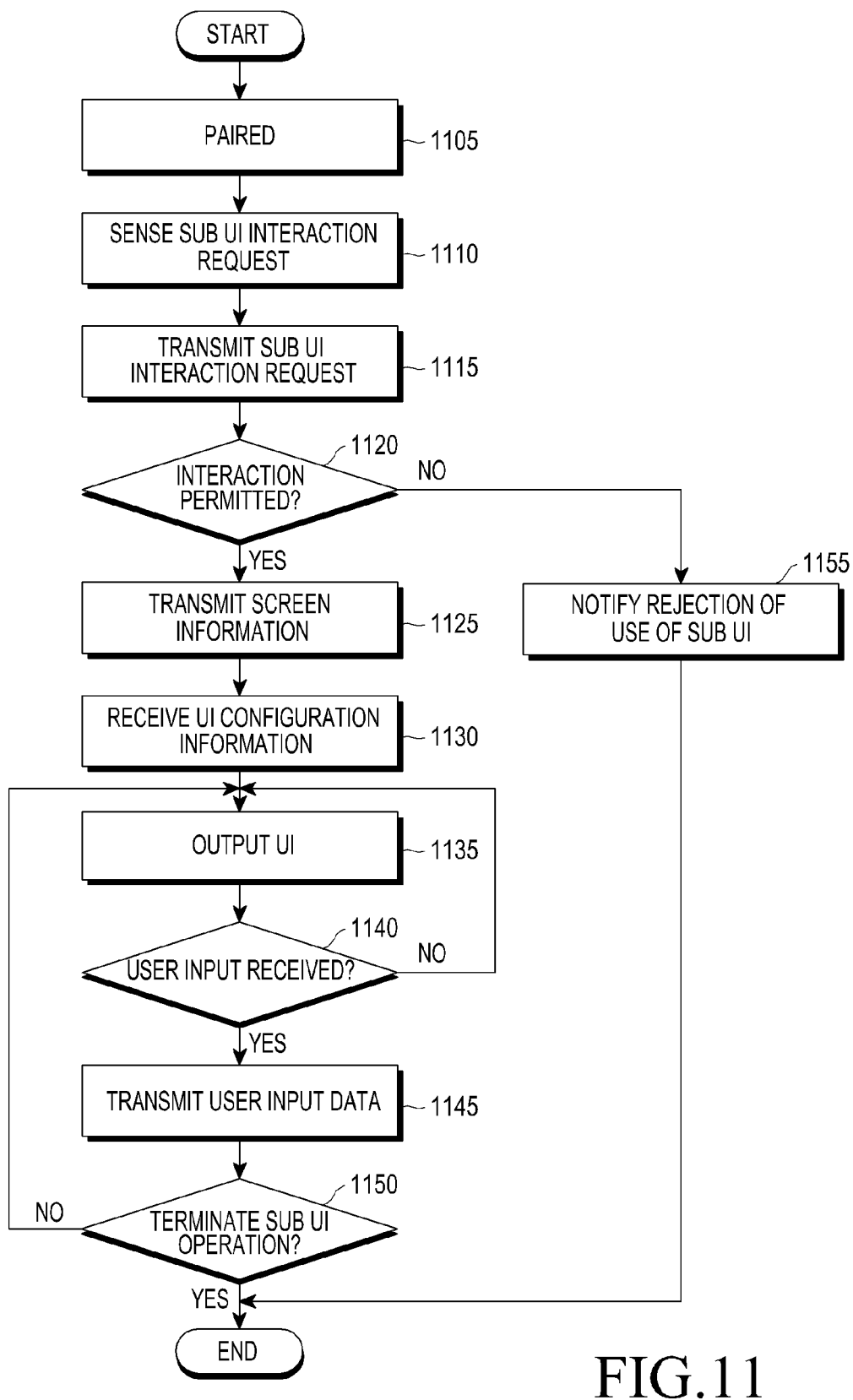
FIG. 11 is a flowchart illustrating a sub UI providing operation using a sub device according to another embodiment of the present disclosure.

FIG. 11 is a flowchart illustrating a sub UI providing operation using a sub device according to another embodiment of the present disclosure.

Referring to FIG. 11, an operation corresponding to a case where the sub device triggers use of the sub UI is illustrated. In operation 1105, the sub device recognizes a connectable portable electronic device. In an embodiment, the sub device may determine that it can communicate with the portable electronic device if a password has been agree with the portable terminal and a mutual authentication has been performed. In an embodiment, if Bluetooth® is used for wireless connection with the portable electronic device, the sub device is paired with the portable electronic device by using Bluetooth®. In operation 1110, the sub device senses a user's request for interaction with the portable electronic device. Herein, the sub device may sense that interaction with the portable electronic device is requested through a touch screen or a physical input means. In an embodiment, if the sub device is implemented with an analog wrist watch, the sub device may determine that interaction with the portable electronic device is requested when the stem of the wrist watch is pulled out. In another embodiment, the sub device provides a soft menu or a soft button for interaction with the portable electronic device on the touch screen, and if sensing a user input such as a touch on the soft menu or the soft button, the sub device may determine that interaction with the portable electronic device is requested. The soft menu or the soft button may be designated to request interaction with the portable electronic device or to request both execution of an application predefined on the portable electronic device, for example, the image editing application, and interaction with the portable electronic device.

In operation 1115, the sub device establishes a connection with the portable electronic device if necessary and sends an interaction request for the use of the sub device as the sub UI to the portable electronic device. In operation 1120, the sub device waits for permission from the portable electronic device. Upon receiving permission of interaction for sub input/output from the portable electronic device, the sub device transmits screen information indicating (e.g., a display shape, a size, and a resolution of the sub device) to the portable electronic device in operation 1125. In an embodiment, if the portable electronic device may obtain screen information of the sub device directly from the sub device through prior connection (for example, Bluetooth® pairing) with the sub device or through the Internet server, operation 1125 may be skipped.

In operation 1130, the sub device receives UI configuration information from the portable electronic device related to the sub UI that is configured based on the screen information. In operation 1135, the sub device outputs the sub UI based on the UI configuration information on its display screen. In an embodiment, the UI configuration information may include a popup menu (e.g., a brush setting of the image editing application running on the portable electronic device) and the popup menu has size, shape, and resolution based on the screen information of the sub device.

In operation 1140, the sub device senses a user input on the popup menu. If the user input touch is sensed, the sub device configures user input data indicating the user input and transmits the user input data to the portable electronic device in operation 1145. In an embodiment, the user input data may be coordinate information indicating a position in which the user input on the popup menu is sensed. In another embodiment, the user input data may include at least one of brush type, brush color, and brush thickness selected on the popup menu.

In operation 1150, the sub device determines whether to terminate interaction with the portable electronic device. In an embodiment, if receiving a command instructing termination of displaying of the sub UI from the portable electronic device, the sub device may terminate displaying of the sub UI. In another embodiment, the sub device may terminate displaying of the sub UI and report termination of interaction to the portable electronic device, if a user input requesting termination of interaction is sensed through a popup menu, another soft menu, or sensing input of a physical button.

Unless receiving a notification indicating permission of interaction for sub input/output from the portable electronic device in operation 1120, the sub device notifies the user of rejection of interaction with the portable electronic device and continues performing a function (for example, a watch function) of the sub device in operation 1155.

Hereinafter, a detailed example of interaction between the portable electronic device and the sub device will be described with reference to the accompanying drawings.

Figure 12A:
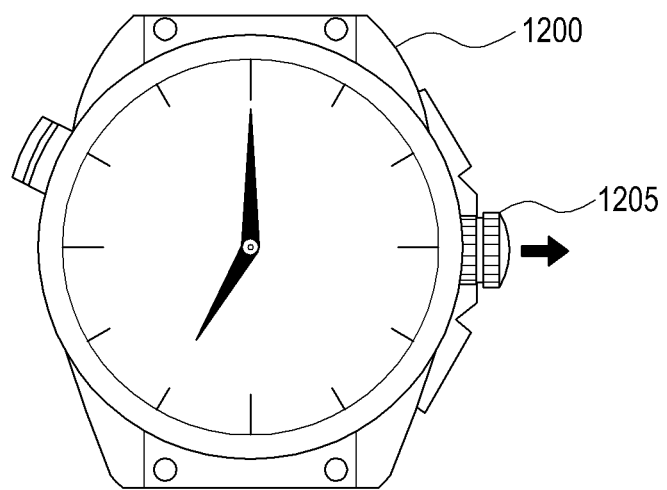
FIGS. 12A and 12B are diagrams for describing interaction between a portable electronic device and a sub device according to an embodiment of the present disclosure.
Figure 12B:
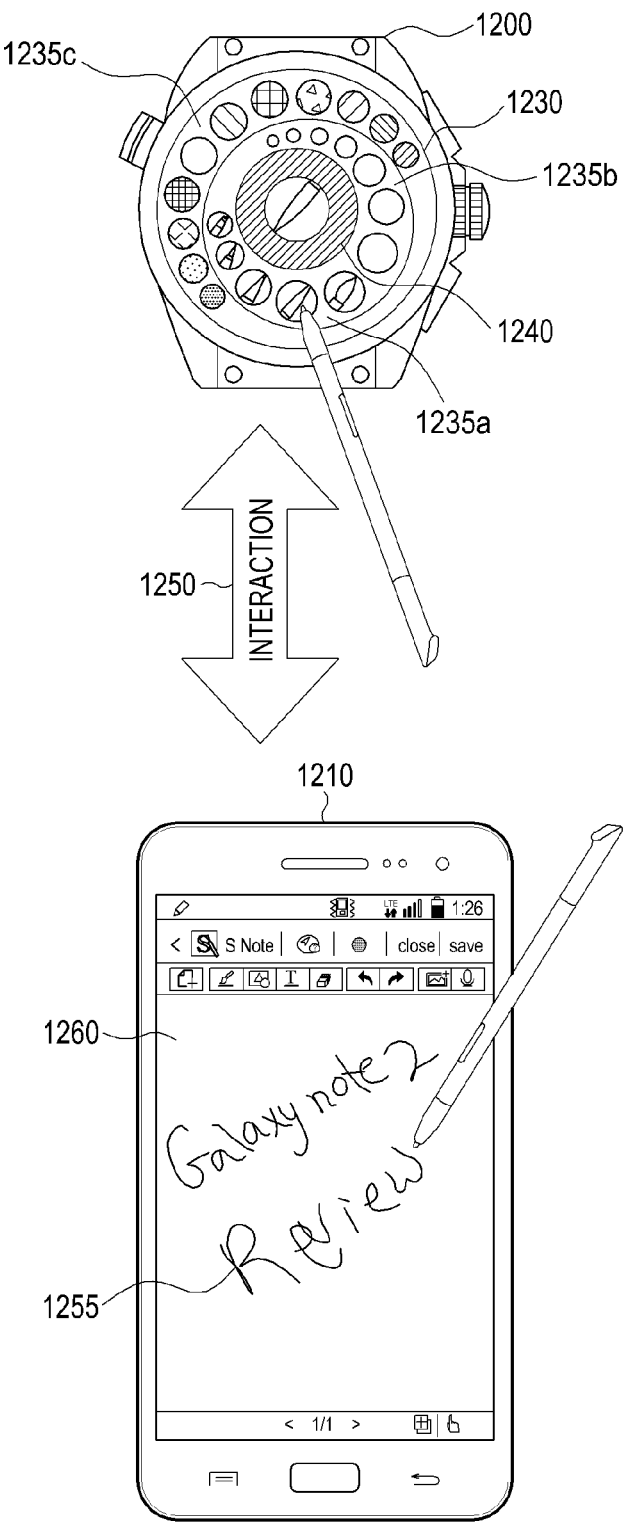

FIGS. 12A and 12B are diagrams for describing interaction between the portable electronic device and the sub device according to an embodiment of the present disclosure.

Referring to FIG. 12A, a sub device 1200 is implemented with a wrist watch that is configured to be connected with a portable electronic device and includes a stem 1205 capable of operating with a physical button. As is shown, when the stem 1205 is pulled out, the wrist watch 1200 determines that interaction for use as the sub UI is requested and transmits an interaction request to the paired portable electronic device. In an embodiment, the wrist watch 1200 displays an icon for requesting interaction for the sub UI mode on the screen implemented with the touch screen and, when the stem 1205 is pulled out after input of the icon is sensed, the wrist watch 1200 may determine that interaction with the portable electronic device is requested.

Referring to FIG. 12B, a portable electronic device 1210 is implemented with a smart phone including the memo application having the image editing function. Upon receiving an interaction request for use as the sub UI from the paired wrist watch 1200 during execution of the memo application, the portable electronic device 1210 informs the wrist watch 1200 of permission of interaction and transmits, to the wrist watch 1200, UI configuration information related to a popup menu that is configured to be suitable for the screen of the wrist watch 1200.

The wrist watch 1200 displays a popup menu 1230 on its screen based on the UI configuration information provided from the smart phone 1210. The popup menu 1230 may have a circular structure suitable for the shape of the screen of the wrist watch 1200, and may include a type selection region 1235*a* for selecting a brush type, a thickness selection region 1235*b* for selecting a brush thickness, a color selection region 1235*c* for selecting a brush color, and a brush state region 1040 indicating a selected brush.

If the user input is sensed in a particular position on the popup menu 1230, the brush state region 1240 is changed corresponding to the position in which the user input is sensed. For example, if the user input is sensed on a black region in the color selection region 1235*c*, the color of the brush state region 1240 is changed into the black color and user input data 1250 indicating information about the position in which the user input is sensed is transmitted to the smart phone 1210. Then, the smart phone 1210 calculates and stores a brush color selected according to the user input data 1250 and displays a hand-drawn picture 1255 in black as the user input moves on a work region 1260.

Figure 13:
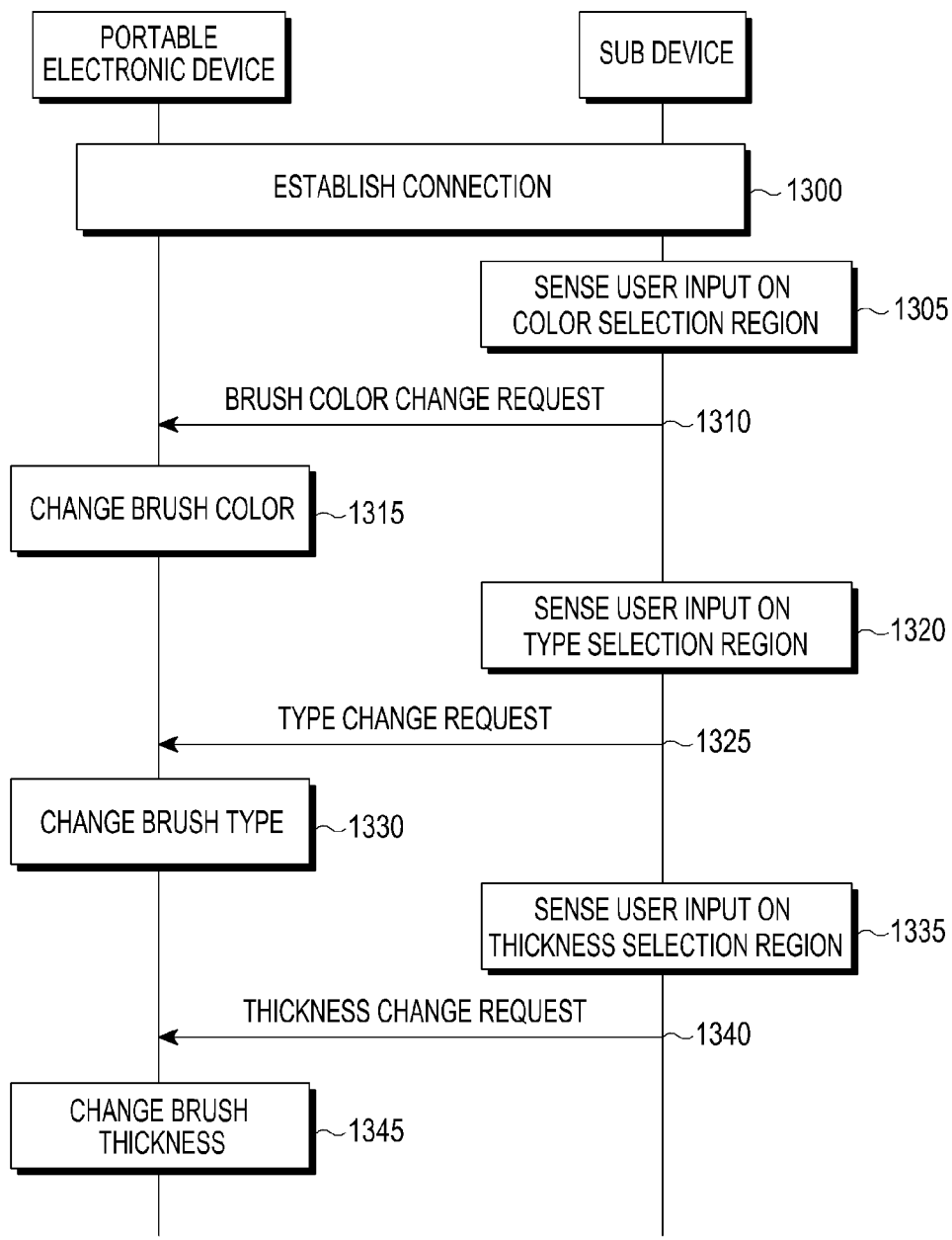
FIG. 13 is a ladder diagram illustrating an operation of changing a brush setting through sub device connected with an image editing application according to an embodiment of the present disclosure.

FIG. 13 is a ladder diagram illustrating an operation of changing a brush setting through a sub device connected with the image editing application according to an embodiment of the present disclosure.

Referring to FIG. 13, in operation 1300, connection between the sub device and the portable electronic device that is executing the image editing application is established and a popup menu that is provided from the portable electronic device is displayed on a display of the sub device. The establishing the of the connection in operation 1300 may be implemented by, for example, operations 605 to 650 of FIG. 6A, operations 705 to 725 of FIG. 7, operations 1005 to 1040 of FIG. 10, and operations 1105 to 1135 of FIG. 11. If a user input is sensed on the color selection region in the popup menu displayed on the display in operation 1305, the sub device proceeds to operation 1310. The user input may be, for example, a touch or a contactless approach. In operation 1310, the sub device transmits user input data indicating a brush color change request to the portable electronic device. For example, the user input data may be coordinate information indicating a position in which the user input on the color selection region is sensed. In another embodiment, the user input data may indicate a color selected on the color selection region.

In operation 1315, the image editing application of the portable electronic device identifies the selected color on the popup menu in response to the user input data, stores a changed brush color according to the identified color, and displays a hand-drawn picture in the changed brush color as the user input sensed on the display of the portable electronic device moves.

If a user input is sensed on the type selection region in the popup menu in operation 1320, the sub device proceeds to operation 1325. The user input may be a touch or a contactless approach. In operation 1325, the sub device transmits user input data indicating a brush type change request to the portable electronic device in response to sensing of the user input. As described above, the user input data may be the coordinate information or a value indicating the selected brush type.

In operation 1330, the image editing application of the portable electronic device identifies the brush type selected on the popup menu in response to the user input data, stores the identified brush type, and displays a hand-drawn picture with the changed brush type as the user input sensed on the display of the portable electronic device moves.

If a user input is sensed on the thickness selection region in the popup menu in operation 1335, the sub device proceeds to operation 1340. The user input may be, for example, a touch or a contactless approach. In operation 1340, the sub device transmits user input data requesting change of a brush thickness to the portable electronic device in response to sensing of the user input. As mentioned above, the user input data may be the coordinate information or a value indicating the selected brush thickness.

In operation 1345, the image editing application of the portable electronic device identifies the selected brush thickness on the popup menu in response to the user input data, stores the identified brush thickness, and displays a hand-drawn picture with the changed brush thickness as the user input sensed on the display of the portable electronic device moves.

Figure 14A:
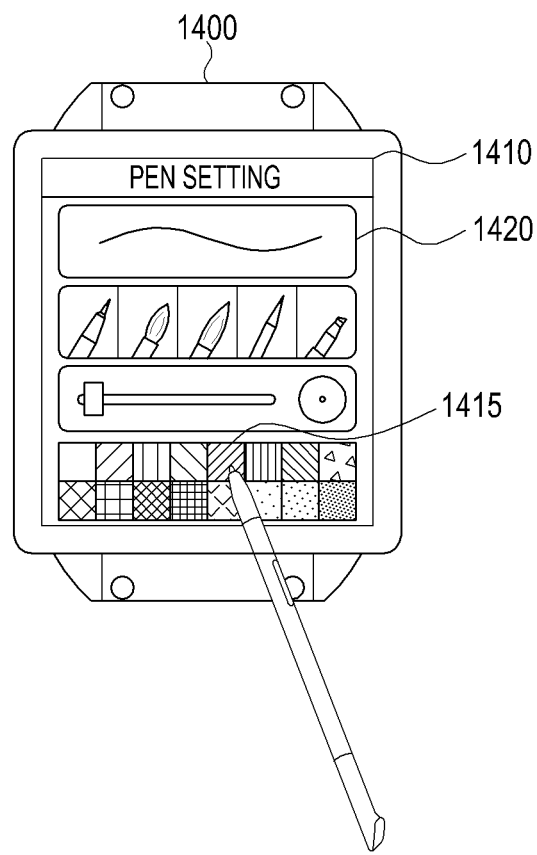
FIGS. 14A and 14B illustrate an operation of changing a brush through a sub device connected with an image editing application according to an embodiment of the present disclosure.
Figure 14B:
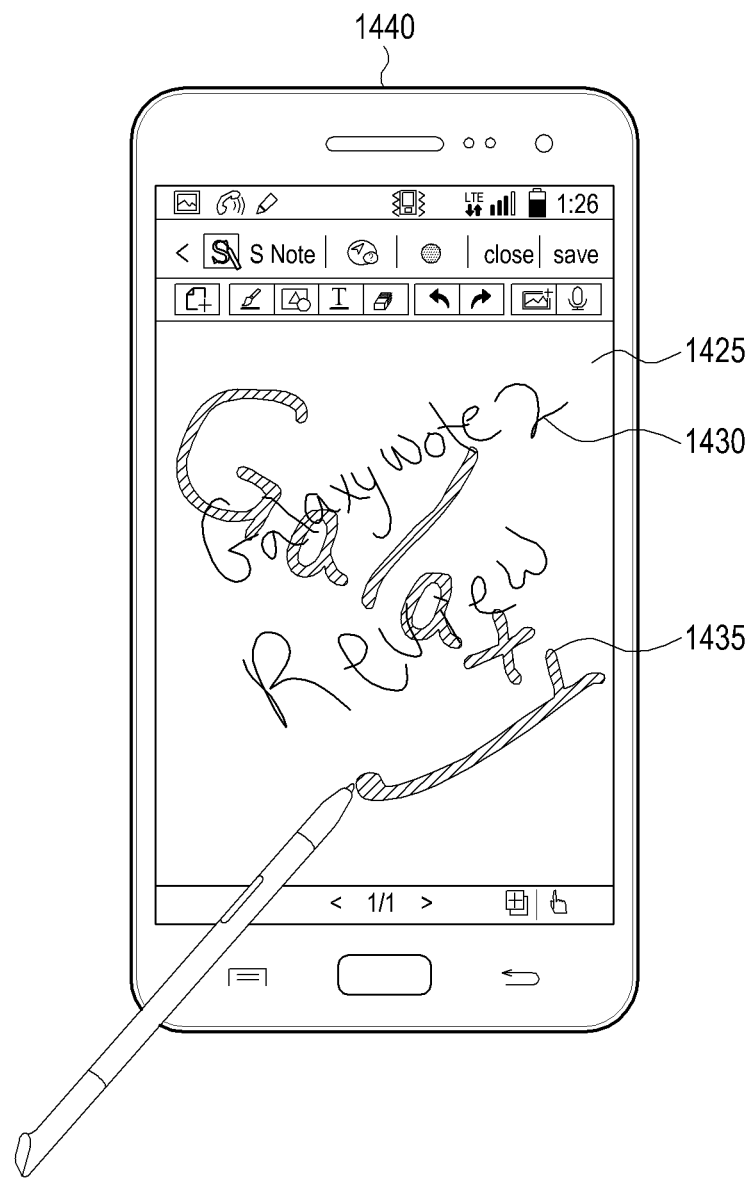

FIGS. 14A and 14B illustrate an example of changing a brush through a sub device connected with an image editing application according to an embodiment of the present disclosure.

Referring to FIG. 14A, a wrist watch 1400 displays a popup menu 1410 interacting with the image editing application, senses a user input on a region of a particular color, for example, a pink region 1415 on the popup menu 1410, and changes the color of a brush state region 1420 into pink in response to the user input. The wrist watch 1400 transmits user input data indicating the user input to the smart phone that is executing the image editing application.

Referring to FIG. 14B, a smart phone 1440 displays a work region 1425 provided by the image editing application, and a previously input black hand-drawn picture 1430 is displayed on the work region 1425. The smart phone 1440 receives user input data requesting change into pink from the wrist watch 1400. The user input data may include coordinate information indicating a position in which the user input is sensed on the wrist watch 1400. In another embodiment, the user input data may include a Red, Green, and Blue (RGB) value indicating the selected color. The smart phone 1440 stores the changed color, which is pink, in response to reception of the user input data. If sensing a user input and movement thereof on the work region 1425, the smart phone 1440 displays a hand-drawn picture 1435 in pink as the user input moves.

In an embodiment, the smart phone 1440 displays a brush state icon indicating at least one of selected color, brush type, and brush thickness inside or outside the work region 1425, allowing the user to rapidly recognize the selected brush on the smart phone 1440.

Figure 15A:
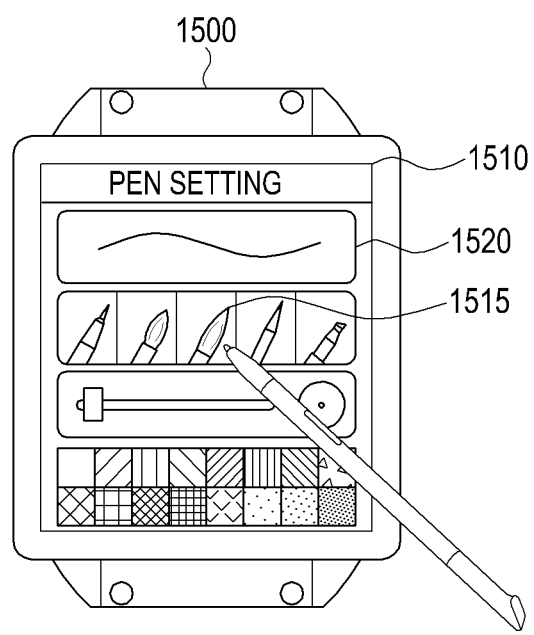
FIGS. 15A and 15B illustrate an operation of changing a brush type through a sub device connected with an image editing application according to an embodiment of the present disclosure.
Figure 15B:
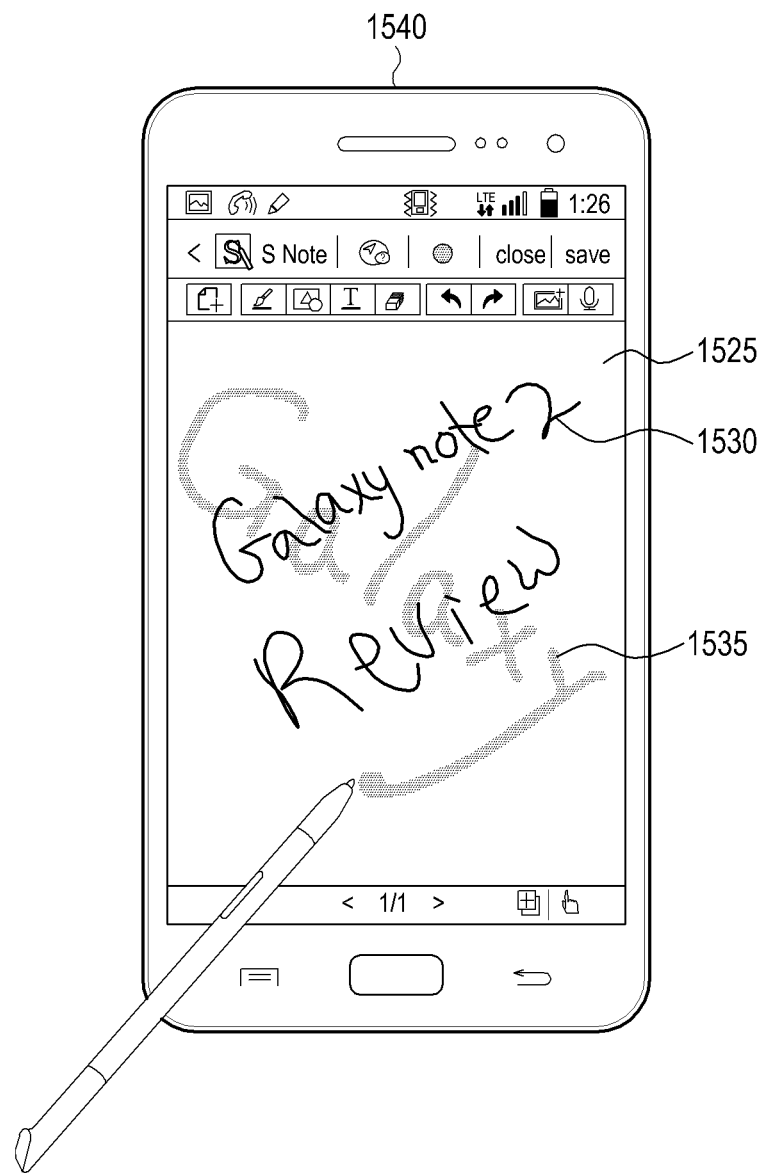

FIGS. 15A and 15B illustrate an example of changing a brush type through a sub device connected with an image editing application according to an embodiment of the present disclosure.

Referring to FIG. 15A, a wrist watch 1500 displays a popup menu 1510 interacting with the image editing application, senses a user input on a region of a particular brush type, for example, a paint brush region 1515 on the popup menu 1510, and displays an icon in the shape of a paint brush on a brush state region 1520. The wrist watch 1500 transmits user input data indicating the user input to the smart phone that is executing the image editing application.

Referring to FIG. 15B, a smart phone 1540 displays a work region 1525 provided by the image editing application, and a previously input brush type hand-drawn picture 1530 is displayed on the work region 1525. The smart phone 1540 receives user input data requesting change into a paint brush from the wrist watch 1500. The user input data may include coordinate information indicating a position in which the user input is sensed on the wrist watch 1500. In another embodiment, the user input data may include an indicator of a selected a paint brush. The smart phone 1540 stores a changed brush type in response to reception of the user input data. Upon sensing the user input movement on the work region 1525, the smart phone 1540 displays a hand-drawn picture 1535 of the selected paint brush type.

Figure 16A:
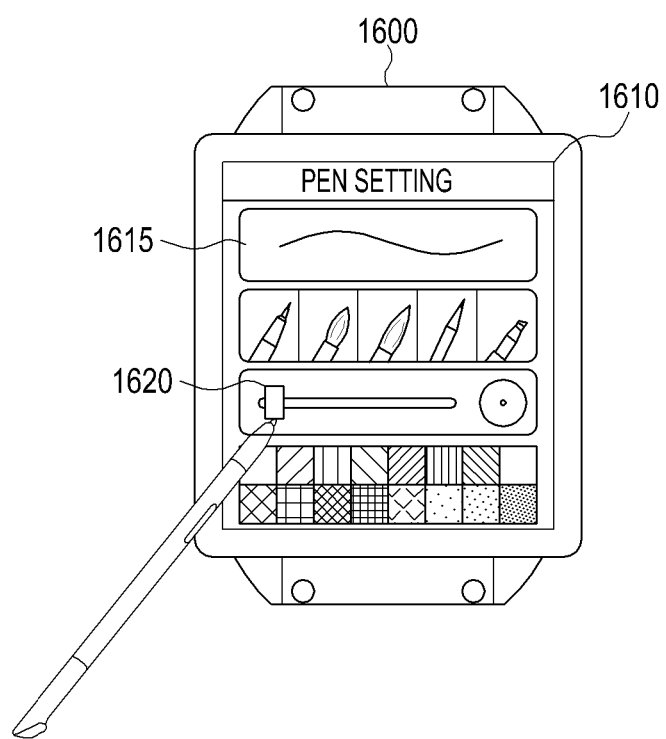
FIGS. 16A and 16B illustrate an operation of changing a brush thickness through a sub device connected with an image editing application according to an embodiment of the present disclosure.
Figure 16B:
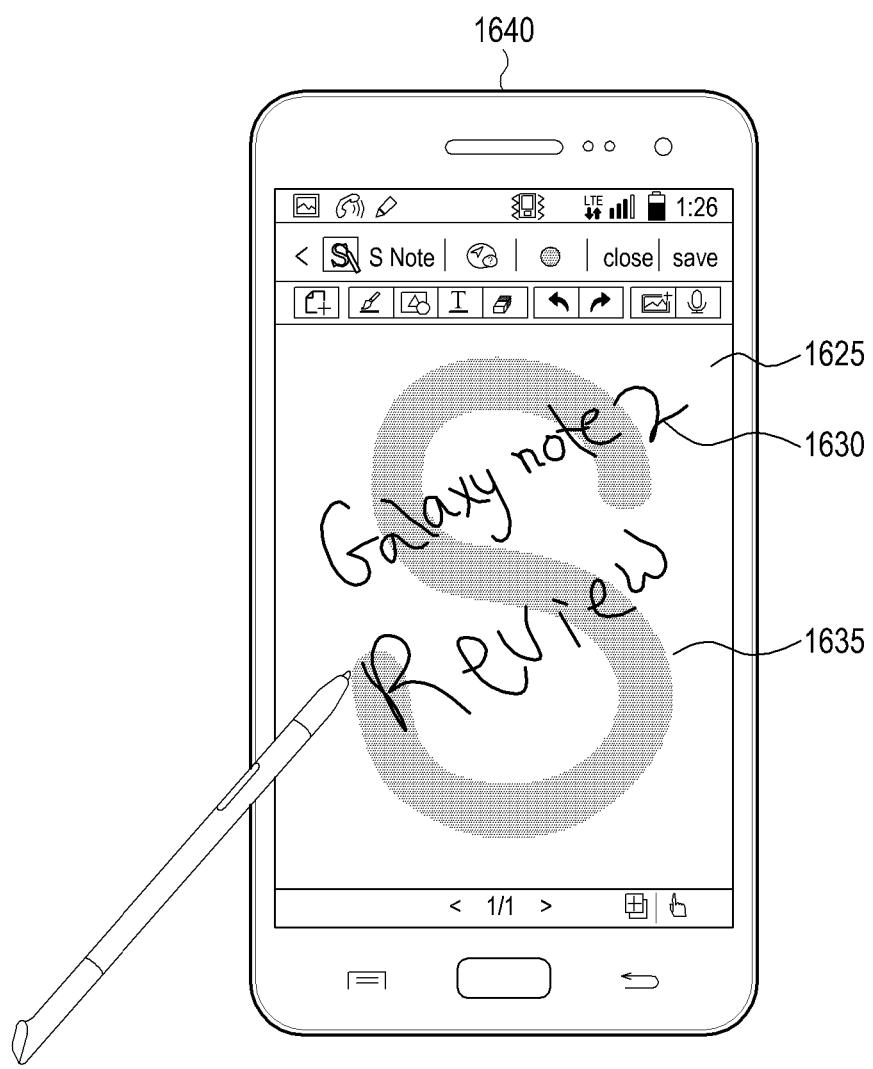

FIGS. 16A and 16B illustrate an example of changing a brush thickness through a sub device connected with the image editing application according to an embodiment of the present disclosure.

Referring to FIG. 16A, a wrist watch 1600 displays a popup menu 1610 interacting with the image editing application, senses a user input on a region of a particular brush thickness, for example, a 3-point thickness region 1620 on the popup menu 1610, and displays an icon indicating a 3-point thickness on a brush state region 1615 in response to the user input. The wrist watch 1600 transmits user input data indicating the user input to the smart phone that is executing the image editing application.

Referring to FIG. 16B, a smart phone 1640 displays a work region 1625 provided by the image editing application and a previously input brush type hand-drawn picture 1630 is displayed on the work region 1625. The smart phone 1640 receives user input data requesting change into a 3-point thickness from the wrist watch 1600. The user input data may include coordinate information indicating a position in which the user input is sensed on the wrist watch 1600. In another embodiment, the user input data may include an indicator of a 3-point thickness. The smart phone 1640 stores the changed brush thickness in response to reception of the user input data. Upon sensing the user input movement on the work region 1625, the smart phone 1640 displays a 3-point thickness hand-drawn picture 1635.

Figure 17A:
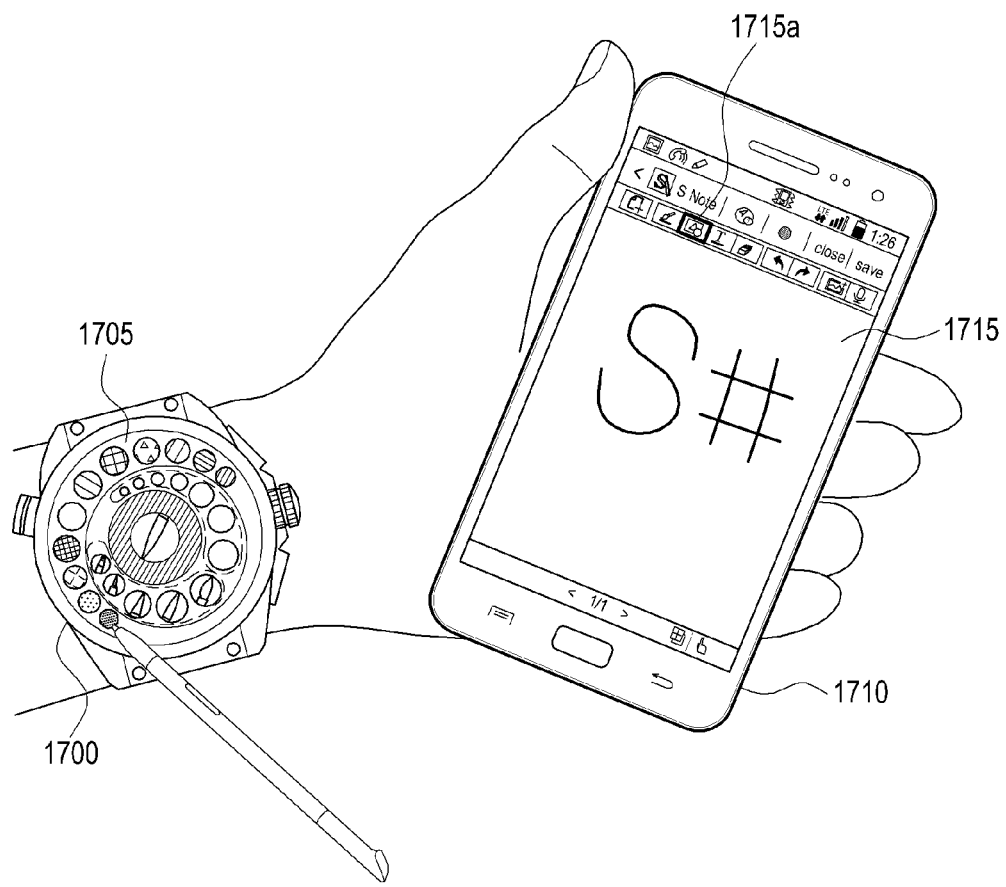
FIGS. 17A and 17B illustrate examples of connection between an image editing application and a wrist watch according to an embodiment of the present disclosure.
Figure 17B:
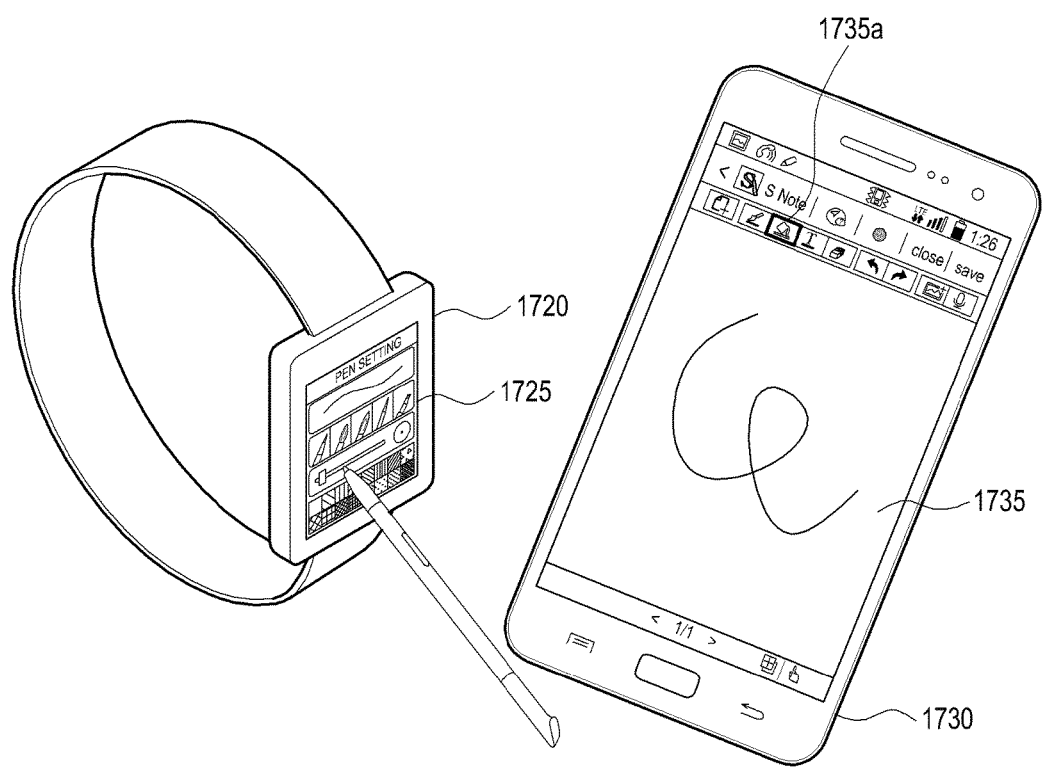

FIGS. 17A and 17B illustrate examples of connection between an image editing application and a wrist watch according to an embodiment of the present disclosure.

Referring to FIG. 17A, a smart phone 1710 displays a work region 1715 provided by the image editing application and a popup menu 1705 generated by the image editing application is configured in a circular form and is displayed on a wrist watch 1700. In an embodiment, the smart phone 1710 may display in a particular position, at least one icon 1715a indicating that the popup menu 1705 is displayed on the wrist watch 1700 and/or indicating a current state of a brush selected on the popup menu 1705.

Referring to FIG. 17B, a smart phone 1730 displays a work region 1735 provided by the image editing application, and a popup menu 1725 generated by the image editing application is reconfigured in a rectangular shape and is displayed on the wrist watch 1720. In an embodiment, the smart phone 1730 may display, in a particular position, at least one icon 1735a indicating that the popup menu 1725 is displayed on the wrist watch 1720 and/or indicating a current state of a brush selected on the popup menu 1725.

In an embodiment, the image editing application may provide an icon indicating that the popup menu is displayed through the sub device on a menu region, and the icon may be configured as a small image indicating the selected brush type, thickness, and color. If the user input is sensed on the icon, the image editing application determines to terminate the sub UI mode and requests the sub device to stop displaying the popup menu.

Figure 18:
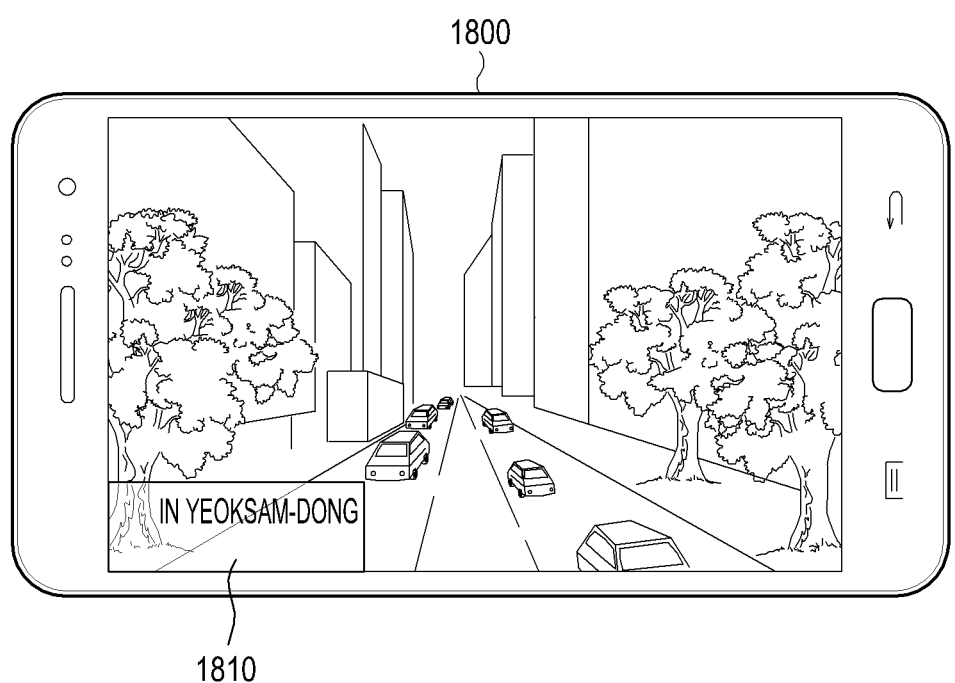
FIG. 18 illustrates a screen of a photo viewer application according to the related art.

FIG. 18 illustrates a screen of a photo viewer application according to the related art.

Referring to FIG. 18, a portable electronic device 1800 is a device such as a smart phone that is executing a photo viewer application and displays a selected photo. After several seconds has elapsed from the first displaying of the photo or if a user's request is input, the portable electronic device 1800 displays detailed information 1810 about the photo on the photo in a popup manner. The detailed information 1810 may include at least one of a file name of the photo, a place where and a date when the photo is taken, and a format and a memo of the photo. The detailed information 1810 is displayed such that it obstructs the photo.

The photo electronic device 1800 establishes connection for using a sub device (not illustrated) as a sub UI with the sub device, and causes the detailed information 1810 to be displayed on the sub device.

Figure 19:
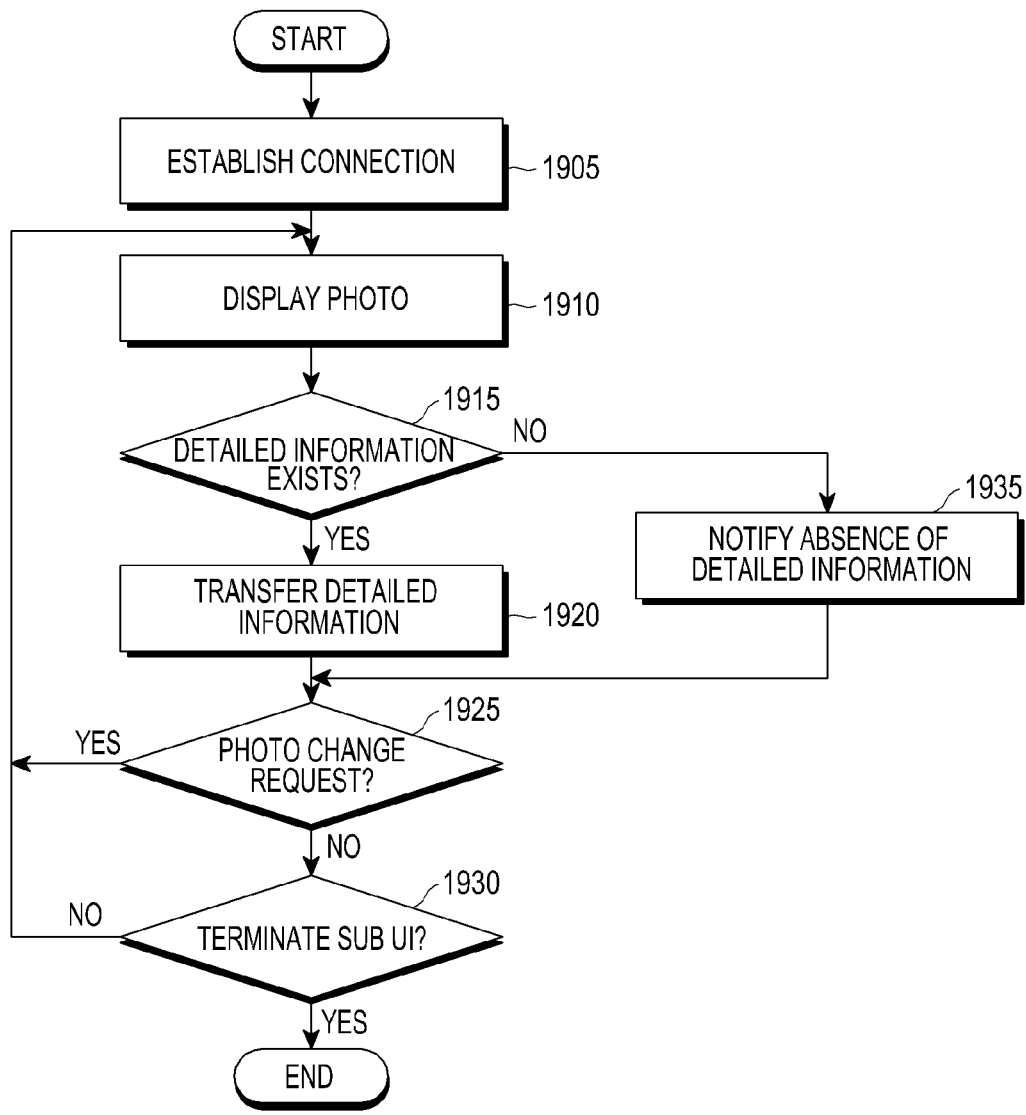
FIG. 19 is a flowchart illustrating an operation of a portable electronic device to provide a sub UI of a photo viewer application through a sub device according to an embodiment of the present disclosure.

FIG. 19 is a flowchart illustrating an operation of a portable electronic device to provide a sub UI of a photo viewer application through a sub device according to an embodiment of the present disclosure.

Referring to FIG. 19, in operation 1905, the portable electronic device establishes connection for using the sub device as a sub UI of the photo viewer application with the sub device and activates a sub UI mode. The connection may be triggered by the portable electronic device or the sub device and, if necessary, the portable electronic device requests the user to permit use of the sub device as the sub UI.

In operation 1910, the portable electronic device displays a user-selected photo on the display through the photo viewer application. In operation 1915, the portable electronic device determines whether stored detailed information about the displayed photo exists. If the detailed information to be displayed does not exist, the portable electronic device informs the user of absence of the detailed information in operation 1935. For example, the phrase "No Information" is displayed over the photo or may be displayed outside the photo. In another embodiment, in operation 1935, the portable electronic device may display just the photo without an additional operation.

On the other hand, if the detailed information to be displayed exists, the portable electronic device transmits UI configuration information indicating the detailed information to the sub device to allow the sub device to display the detailed information on the display of the sub device in operation 1920. In operation 1925, the portable electronic device determines whether there is a photo change request for changing a photo to be displayed. For example, if sensing a movement command (e.g., a sliding, a flick, or the like) on the currently displayed photo or a user input such as a touch on a movement soft key provided on the screen, the portable electronic device determines that displaying of a previous or next photo is requested and proceeds back to operation 1910.

On the other hand, if the photo change request does not exist, the portable electronic device determines whether termination of the sub UI mode is requested in operation 1930. In an embodiment, the portable electronic device provides an icon indicating that the sub UI is used on a menu region of the photo viewer application or through the sub device and determines to terminate the sub UI mode if a user input is sensed on the icon. In another embodiment, the portable electronic device may determine to terminate the sub UI mode if the photo viewer application is terminated. If determining to terminate the sub UI mode, the portable electronic device instructs the sub device to terminate displaying of the sub UI. In this state, unless the sub device is used for other purposes, the portable electronic device may release connection with the sub device. If displaying of the sub UI is terminated without termination of the photo viewer application, the portable electronic device may display detailed information of the photo on its display screen at the request of the user.

Figure 20:
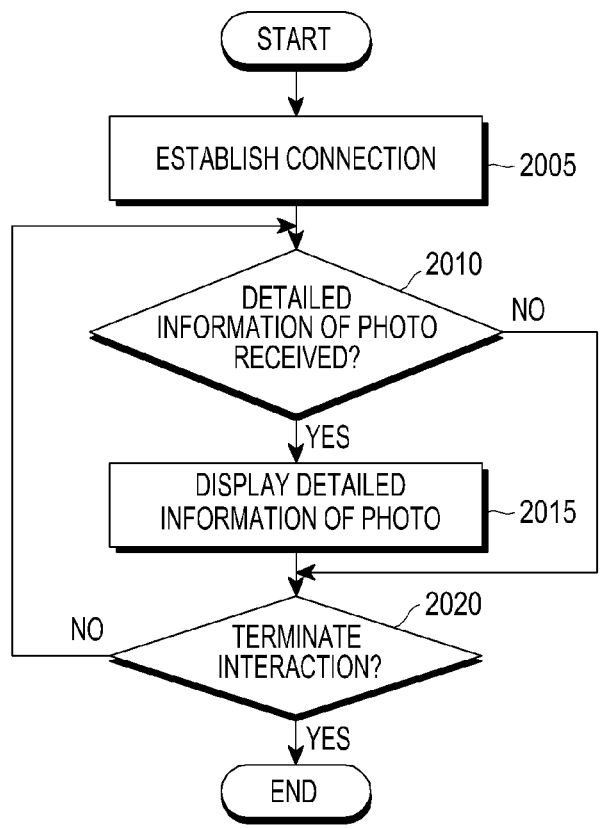
FIG. 20 is a flowchart illustrating an operation of a sub device to provide a sub UI of a photo viewer application according to an embodiment of the present disclosure.

FIG. 20 is a flowchart illustrating an operation of a sub device to provide a sub UI of a photo viewer application according to an embodiment of the present disclosure.

Referring to FIG. 20, in operation 2005, the sub device establishes connection with the portable electronic device to operate as the sub UI of the portable electronic device. The connection may be triggered by the portable electronic device or the sub device. In operation 2010, the sub device determines whether detailed information is received from the portable electronic device. For example, the detailed information may be detailed information of a photo provided by the photo viewer application executing in the portable electronic device. If the received detailed information exists, the sub device displays the detailed information on its display screen in operation 2015. In operation 2020, the sub device determines whether to terminate interaction with the portable electronic device. In an embodiment, upon receiving a command instructing termination of displaying of the sub UI from the portable electronic device, the sub device terminates interaction with the portable electronic device and displaying of the sub UI. In another embodiment, the sub device displays an icon indicating that the sub UI is being provided on its display screen, terminates displaying of the sub UI if a user input is sensed such as a touch on the icon or input of a physical button for requesting termination of the interaction, and reports the termination of the interaction to portable electronic device.

FIGS. 21A, 21B, 21C, and 21D are diagrams for describing an operation of providing a sub UI of the photo viewer application according to an embodiment of the present disclosure.

Figure 21A:
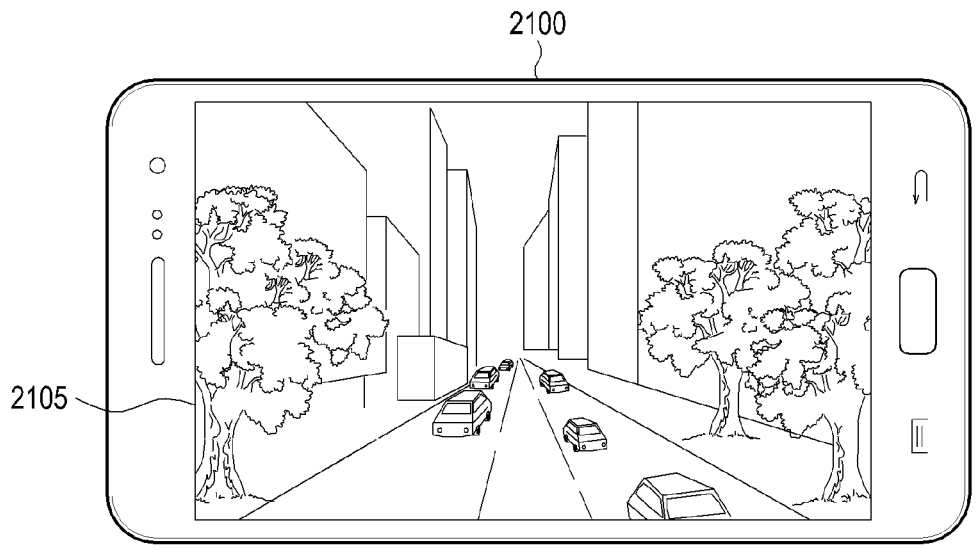
FIGS. 21A, 21B, 21C, and 21D are diagrams for describing an operation of providing a sub UI of a photo viewer application according an embodiment of the present disclosure.

Referring to FIG. 21A, a portable electronic device 2100 is implemented with a smart phone that is executing the photo viewer application and displays a photo 2105 through the photo viewer application.

Figure 21B:
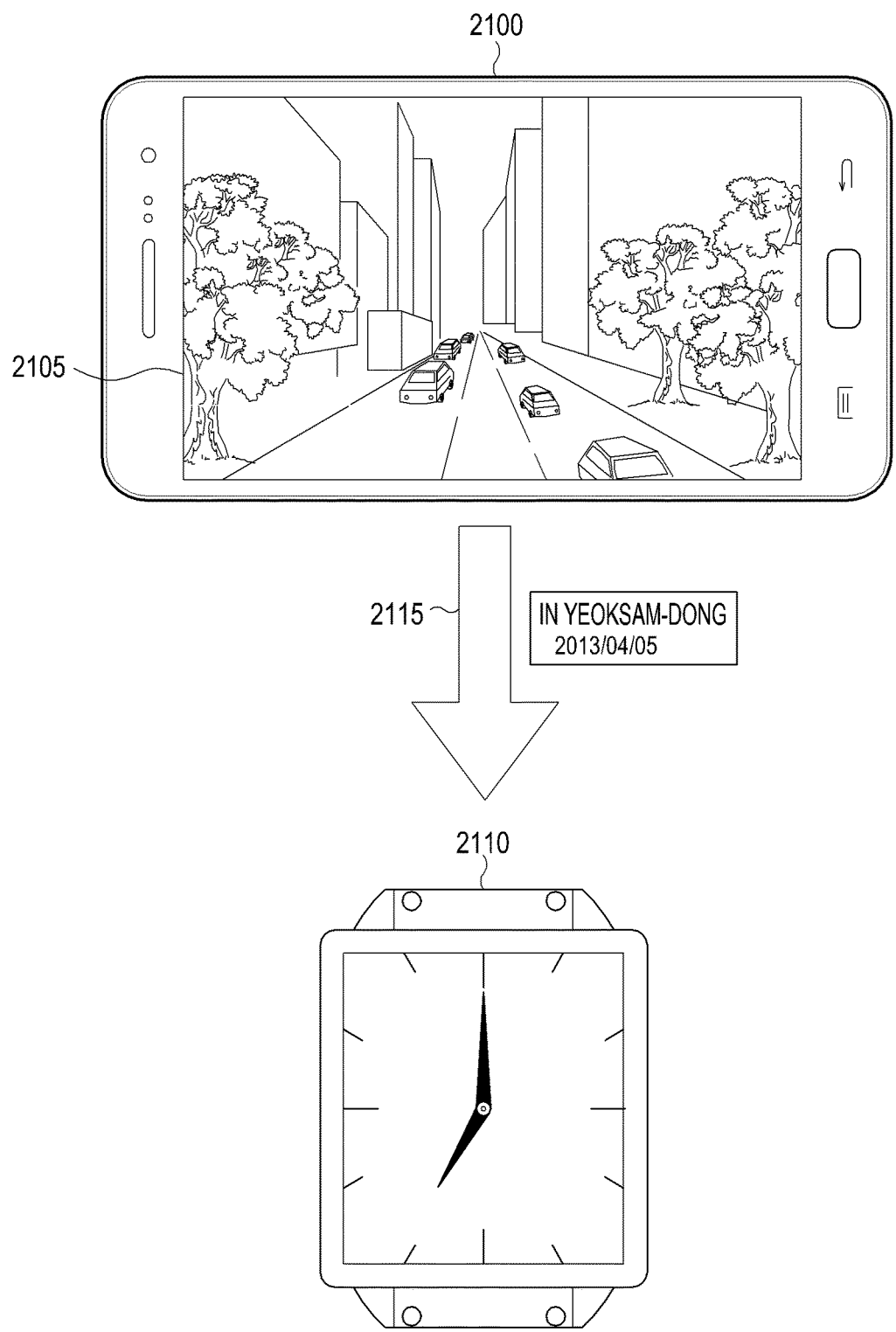

Referring to FIG. 21B, the portable electronic device 2100 determines whether detailed information 2115 related to a photo 2105 exists and, if the detailed information 2115 exists and a sub device 2110 to be used as a sub UI exists, then the portable electronic device 2100 transmits the detailed information 2115 to the sub device 2110.

Figure 21C:
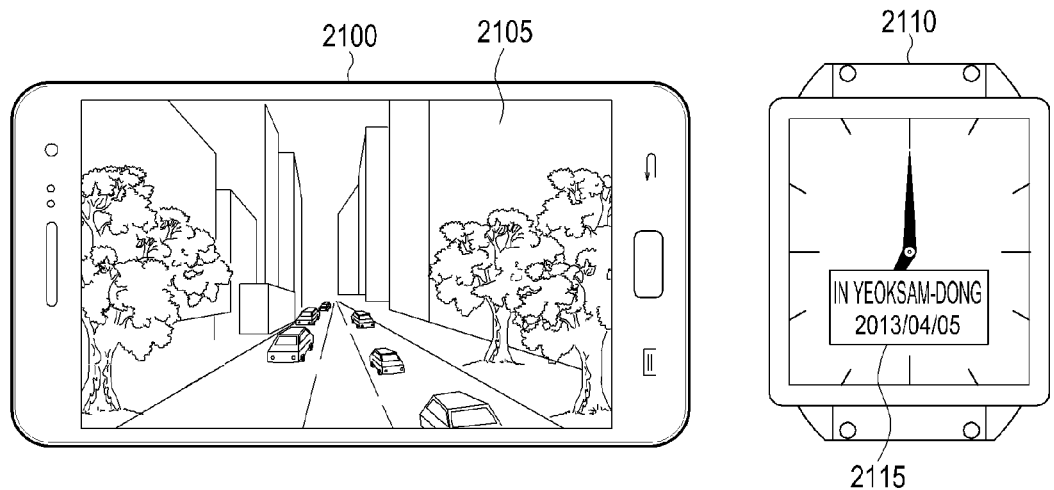

Referring to FIG. 21C, the sub device 2110 may be implemented with a wrist watch configured to be connected with the portable electronic device 2100 and displays the detailed information 2115 received from the portable electronic device 2100. In an embodiment, the detailed information 2115 may be displayed over the original screen (for example, a watch screen) corresponding to a primary function of the sub device 2110. In another embodiment, the detailed information 2115 may be displayed in place of the original screen of the sub device 2110. In another embodiment, when the detailed information 2115 is received, the original screen of the sub device 2110 may be reduced (or transformed) and the detailed information may be displayed on the other region than a reduced region of the original screen.

Figure 21D:
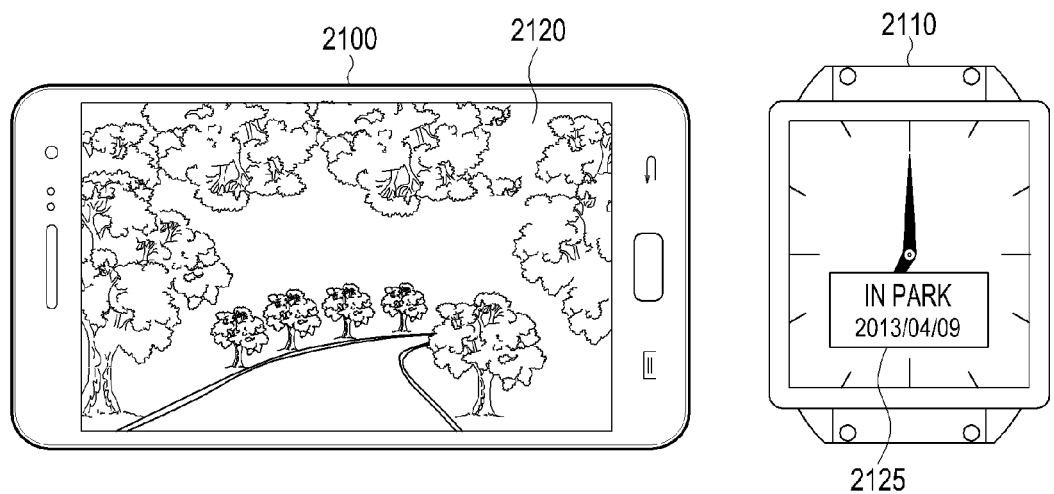

Referring to FIG. 21D, if another photo 2120 is displayed on the portable electronic device 2100, the sub device 2110 displays detailed information 2125 of the photo 2120 in the same manner as the foregoing manner.

Figure 22:
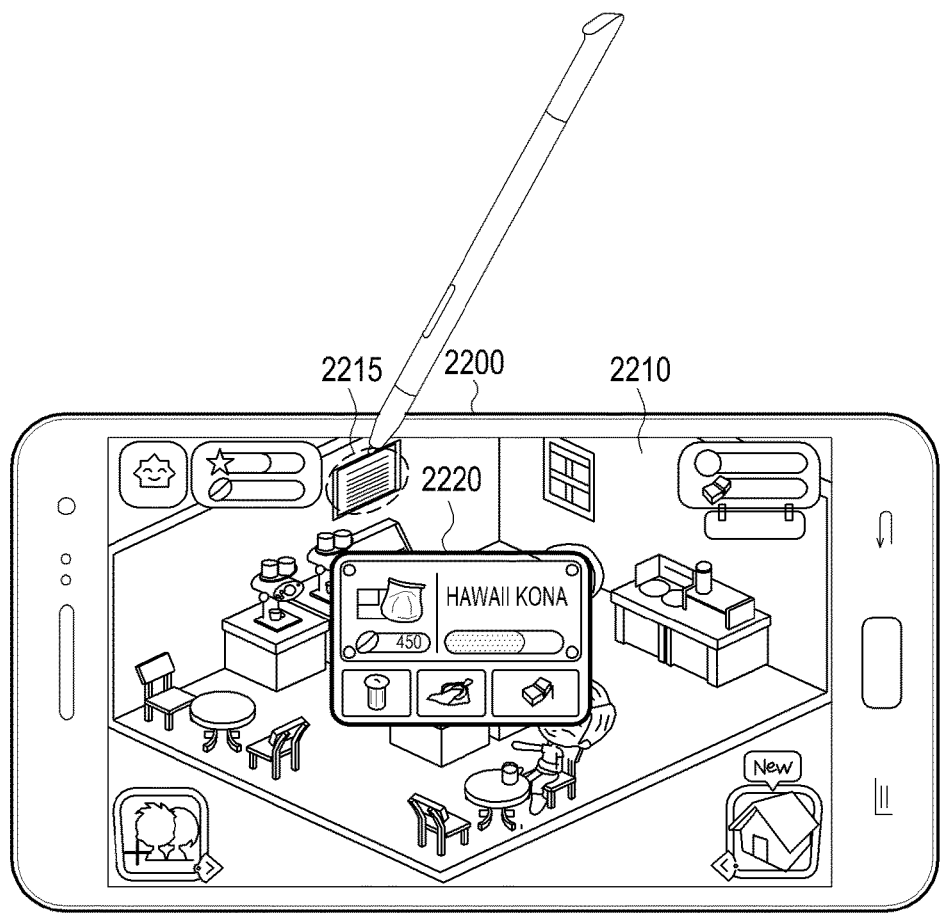
FIG. 22 illustrates a screen of a game application according to the related art.

FIG. 22 illustrates a screen of a game application according to the related art.

Referring to FIG. 22, a portable electronic device 2200 is a device such as a smart phone that is executing the game application and displays an execution screen 2210 of the game application. A game application of a particular type displays various objects through the execution screen and, if a particular object 2215 is selected (for example, touched), detailed information of the object 2215 is displayed in a popup menu 2220 for setting the object 2215. In particular, for a game played in real time, size and position of the popup menu 2220 needs to be carefully selected so as not to interrupt game play due to displaying of the popup menu 2220.

The portable electronic device 2200 establishes connection with a sub device (not illustrated) to use the sub device as a sub UI and causes the sub device to display the popup menu 2220.

Figure 23:
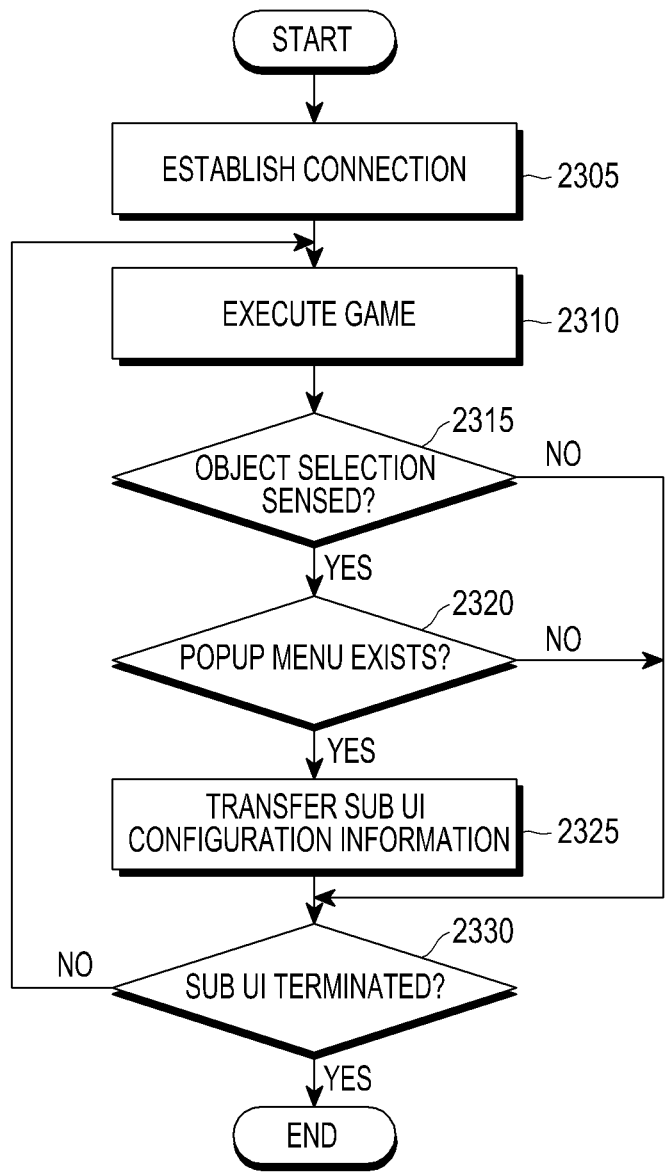
FIG. 23 is a flowchart illustrating an operation of a portable electronic device to provide a sub UI of a game application through a sub device according to an embodiment of the present disclosure.

FIG. 23 is a flowchart illustrating an operation of the portable electronic device to provide a sub UI of a game application through a sub device according to an embodiment of the present disclosure.

Referring to FIG. 23, in operation 2305, the portable electronic device establishes connection with the sub device to use the sub device as a sub UI of the game application. The connection may be triggered by the portable electronic device or the sub device and, if necessary, the portable electronic device may request the user to permit whether to use the sub device as the sub UI.

In operation 2310, the portable electronic device displays an execution screen of the game application and the execution screen may include one or more objects needed to play the game. In operation 2315, the portable electronic device determines whether a particular object is selected on the execution screen. For example, if a user input touch is sensed on the object, the portable electronic device may determine that the object is selected. If the object is selected, the portable electronic device determines whether a popup menu for the selected object exists in operation 2320. In an embodiment, the popup menu may include detailed information of the selected object and/or at least one soft key for setting information of the selected object. In another embodiment, the popup menu may include at least one of a name and detailed information of the selected object.

If the popup menu to be displayed exists, the portable electronic device transmits sub UI configuration information indicating the popup menu to the sub device to cause the sub device to display the popup menu on the display of the sub device in operation 2325. Although not shown, if necessary, the popup menu may be configured according to physical shape and resolution of the sub device, and to this end, the portable electronic device may obtain screen information indicating the physical shape and resolution of the sub device from the sub device and/or the Internet server.

In operation 2330, the portable electronic device determines whether termination of the sub UI mode is requested. In an embodiment, the portable electronic device provides the icon indicating that the sub UI is being used through a particular region in the running screen of the game application or through the sub device and, if sensing the user input on the icon, the portable electronic device determines to terminate the sub UI mode. In another embodiment, the portable electronic device may determine to terminate the sub UI mode if the game application is terminated. If determining to terminate the sub UI mode, the portable electronic device instructs the sub device to terminate displaying of the sub UI. In this state, unless the sub device is used for other purposes, the portable electronic device may release connection with the sub device. If the displaying of the sub UI is terminated without termination of the game application, the portable electronic device may display the popup menu on its display screen at the request of the user.

Figure 24:
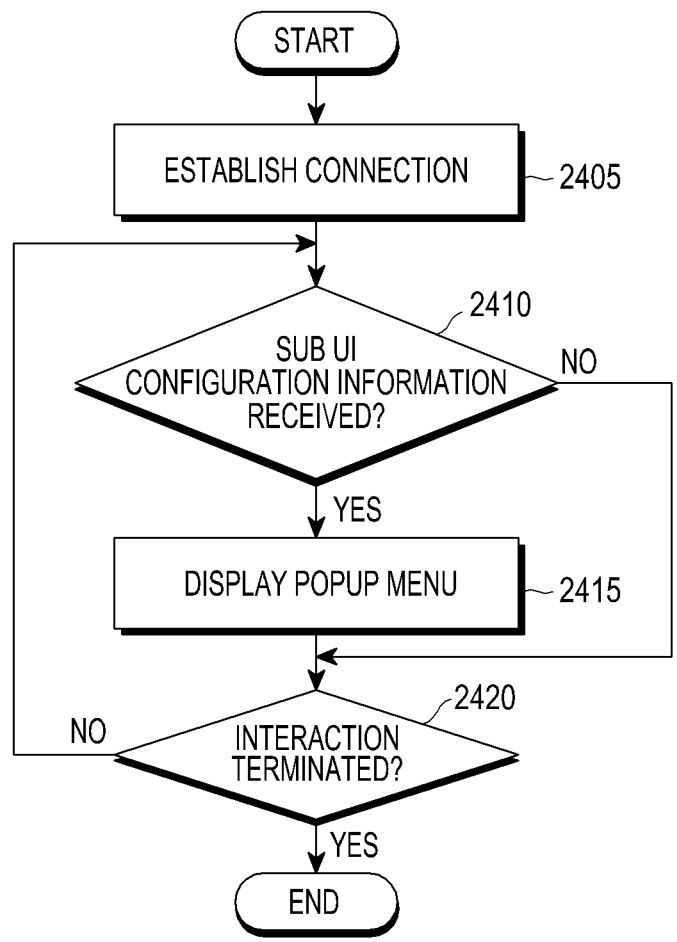
FIG. 24 is a flowchart illustrating an operation of a sub device to provide a sub UI of a game application according to an embodiment of the present disclosure.

FIG. 24 is a flowchart illustrating an operation of the sub device to provide a sub UI of the game application according to an embodiment of the present disclosure.

Referring to FIG. 24, in operation 2405, the sub device establishes connection with the portable electronic device for operating as the sub UI of the portable electronic device. The connection may be triggered by the portable electronic device or the sub device. In operation 2410, the sub device determines whether sub UI configuration information indicating the sub UI is received from the portable electronic device. For example, the sub UI configuration information may be a popup menu including detailed information of a particular object in the game application and/or at least one soft key for setting information. Although not shown, if necessary, the popup menu may be configured according to physical shape and resolution of the sub device, and to this end, the sub device may transfer screen information indicating physical shape and resolution of the sub device to the portable electronic device.

If received sub UI configuration information exists, the sub device displays the popup menu on its display screen in operation 2415. In operation 2420, the sub device determines whether to terminate interaction with the portable electronic device. In an embodiment, if receiving a command instructing termination of displaying of the sub UI from the portable electronic device, the sub device terminates displaying of the sub UI. In another embodiment, the sub device displays an icon indicating that the sub UI is being provided on its display screen, terminates displaying of the sub UI and reports the termination to the portable electronic device if the user input on the icon is sensed or input of a physical button for requesting the termination of the interaction.

Figure 25A:
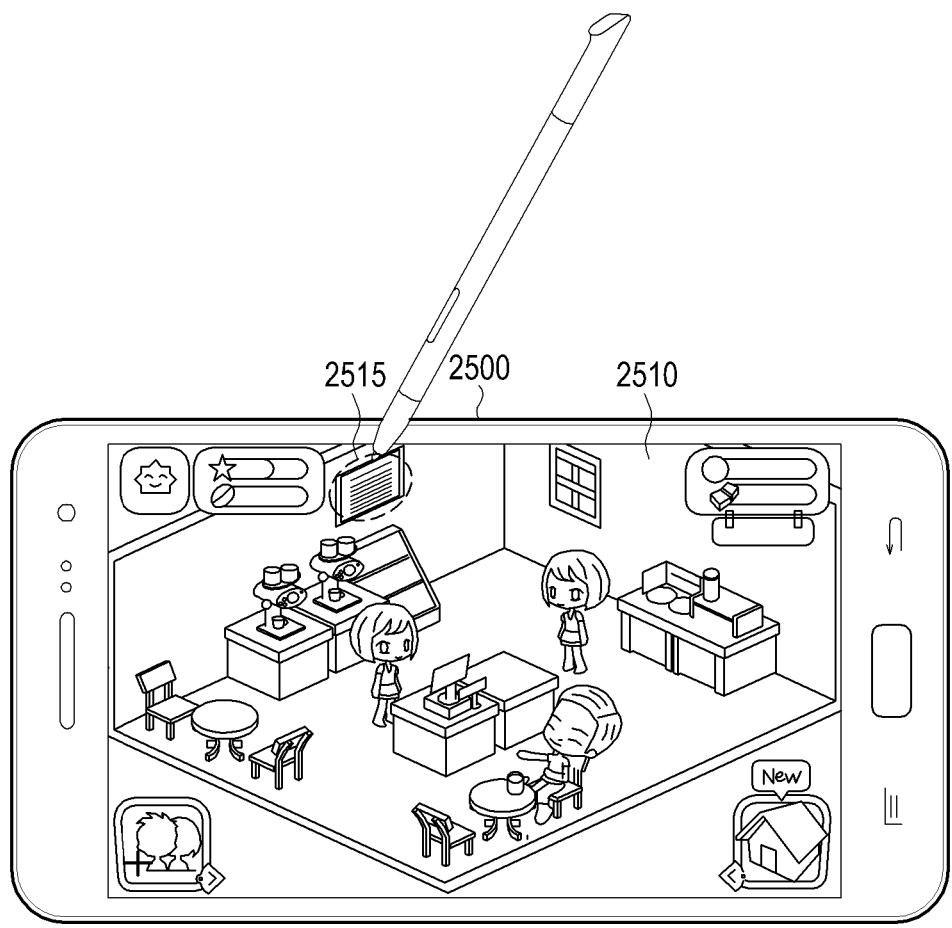
FIGS. 25A, 25B, and 25C are diagrams for describing an operation of providing a sub UI of a game application according to an embodiment of the present disclosure.
Figure 25B:
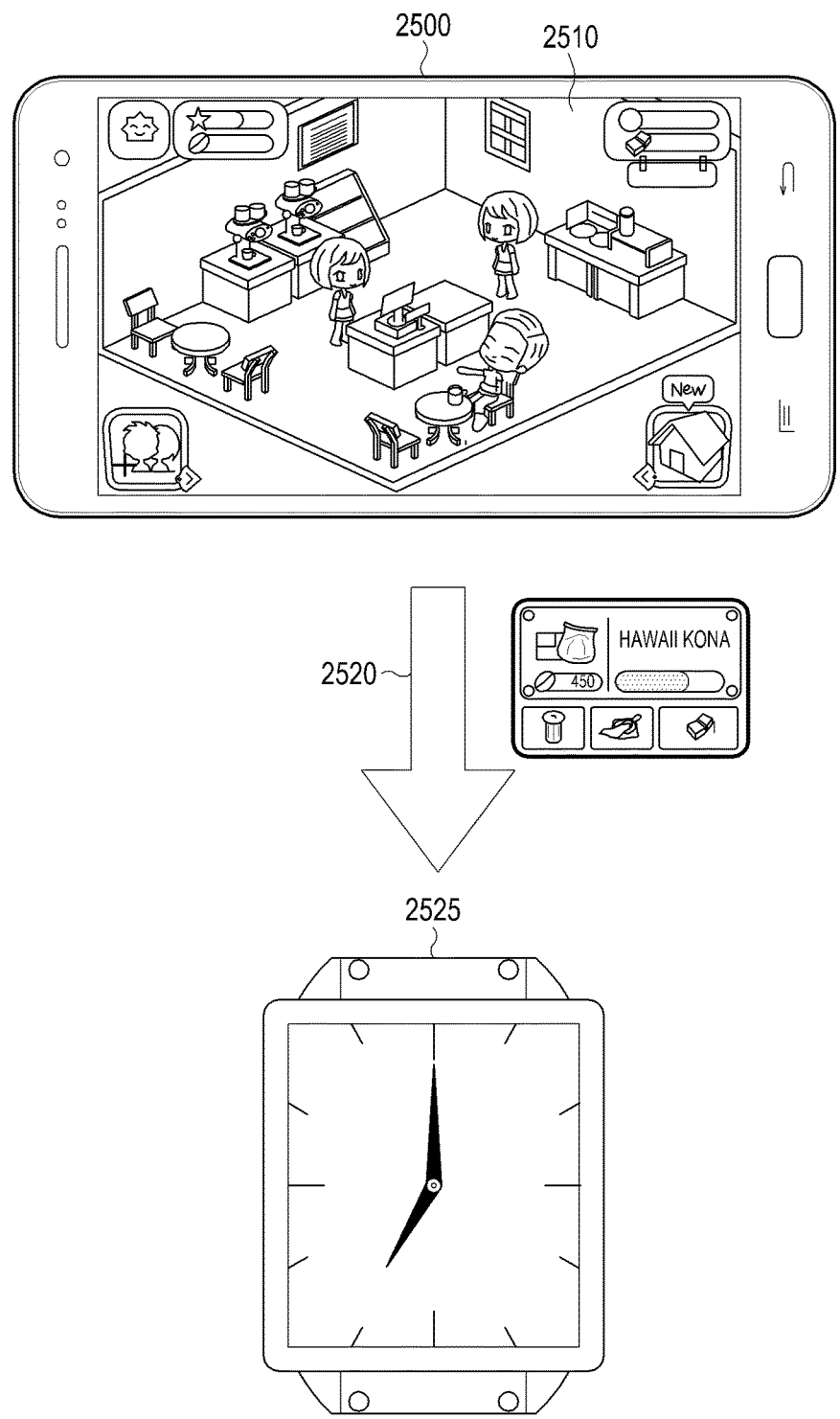
Figure 25C:
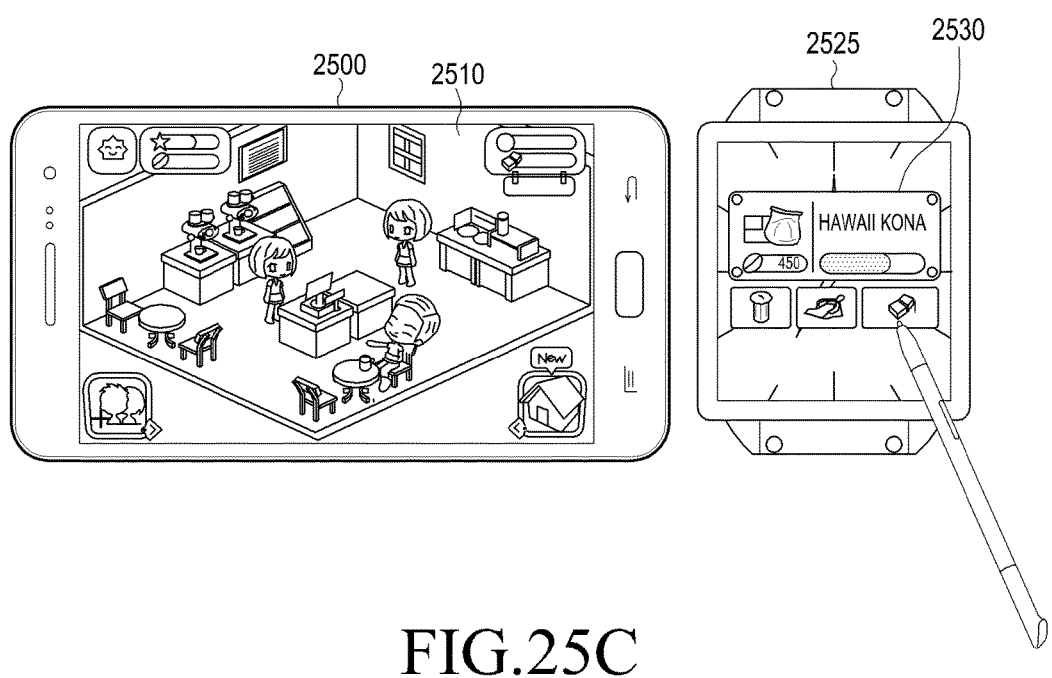

FIGS. 25A, 25B, and 25C are diagrams for describing an operation of providing a sub UI of a game application according to an embodiment of the present disclosure.

Referring to FIG. 25A, a portable electronic device 2500 is implemented with a smart phone that is executing a game application and displays an execution screen 2510 of the game application. The running screen 2510 may include one or more objects 2515 necessary for game play.

Referring to FIG. 25B, the portable electronic device 2500 senses that displaying of a popup menu for an object included in the running screen 2510 is requested. For example, if sensing a user input on an object displayed on the execution screen 2510 or determining that the game application is to provide additional information about a particular object, then the portable electronic device 2500 may determine that displaying of the popup menu is requested. If displaying of the popup menu is requested and a sub device 2510 to be used as the sub UI exists, sub UI configuration information 2520 indicating the popup menu is transmitted to the sub device 2510.

Referring to FIG. 25C, the sub device 2525 may be implemented with a wrist watch configured to be connected with the portable electronic device 2500, and displays a popup menu 2530 corresponding to the sub UI configuration information 2520 received from the portable electronic device 2500 on its display screen. In an embodiment, the popup menu 2530 may be displayed over the original screen (for example, a watch screen) corresponding to a function of the sub device 2525. In another embodiment, the popup menu 2530 may be displayed in place of the original screen of the sub device 2525. In another embodiment, if the sub UI configuration information 2520 is received, the original screen of the sub device 2525 is displayed reduced (or transformed), and the popup menu 2530 may be displayed in the other region than a reduced region of the original screen.

Other effects that may be obtained or expected from the embodiment of the present disclosure are explicitly or implicitly disclosed in the detailed description of the embodiment of the present disclosure. That is, various effects expected from the embodiment of the present disclosure have been disclosed in the detailed description of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display method using a sub device connectable with a portable electronic device, the display method comprising:
   executing by the portable electronic device, an application to display a working region of the application on a display of the portable electronic device;
   detecting, by the portable electronic device, a first user input for displaying a popup menu being provided by the executing application on the sub device;
   generating, by the portable electronic device, configuration information corresponding to the popup menu according to at least one of a display shape, a display size, or a display resolution of the sub device;
   transmitting, by the portable electronic device, the configuration information corresponding to the popup menu to the sub device;
   receiving, from the sub device, user input data corresponding to a second user input detected on the popup menu that is displayed on the sub device; and
   controlling execution of the application on the display of the portable electronic device in response to the received user input data,
   wherein the application is an image editing application, and
   wherein the popup menu comprises at least one of a brush setting menu generated by the image editing application that is being executed on the portable electronic device.

2. The display method of claim 1, further comprising obtaining screen information corresponding to the display shape, the display size, and the display resolution of the sub device, from at least one of the sub device or a network entity.

3. The display method of claim 1, wherein the user input data comprises coordinate information indicating a position where the user input is detected on the popup menu or indicates a command corresponding to the user input.

4. The display method of claim 1, further comprising:
   receiving an interaction request for use of the sub device as a sub user interface from the sub device; and
   notifying the sub device of an interaction permission.

5. The display method of claim 1, further comprising:
   if the application supports a sub user interface mode, determining whether the sub device is available as the sub user interface; and
   sending the interaction request to the sub device.

6. A method for displaying a popup menu, which is displayable on a portable electronic device, on a sub device, the method comprising:
   receiving, from the portable electronic device, configuration information corresponding to a popup menu provided by an application that is being executed on the portable electronic device;
   displaying the popup menu on a display screen of the sub device based on the configuration information;
   detecting a user input on the popup menu displayed on a display screen of the sub device; and
   transmitting user input data corresponding to the detected user input to the portable electronic device,
   wherein the configuration information is configured by the portable electronic device according to at least one of a display shape, a display size, or a display resolution of the sub device before transmitting to the sub device, and
   wherein the application is an image editing application, and the popup menu comprises at least one of a brush setting menu generated by the image editing application that is being executed on the portable electronic device.

7. The method of claim 6, further comprising transmitting information corresponding to the display shape, the display size, and the display resolution of the sub device to the portable electronic device.

8. The method of claim 6, wherein the user input data comprises coordinate information indicating a position where the user input is detected on the popup menu or indicates a command corresponding to the user input.

9. The method of claim 6, further comprising:
sending an interaction request for preferential use of the sub device as a sub user interface of the portable electronic device in the sub device to the portable electronic device; and
receiving an interaction permission from the portable electronic device.

10. The method of claim 6, further comprising receiving an interaction request for use of the sub device as a sub user interface of the portable electronic device from the portable electronic device.

11. A portable electronic device for displaying a popup menu through a sub device, the portable electronic device comprising:
a display screen configured to display information generated by an application that is being executed;
at least one processor configured to:
execute an application to display a working region of the application on a display of the portable electronic device,
detect a first user input for displaying a popup menu being provided by the executed application on the sub device,
generate configuration information corresponding to the popup menu according to at least one of a display shape, a display size, or a display resolution of the sub device, and
control execution of the application on the display of the portable electronic device in response to a second user input detected on the popup menu; and
a transceiver configured to:
transmit the configuration information to the sub device, and
receive user input data from the sub device corresponding to the second user input detected on the popup menu that is displayed on the sub device,
wherein the application is an image editing application, and the popup menu comprises at least one of a brush setting menu generated by the image editing application that is being executed on the portable electronic device.

12. The portable electronic device of claim 11, wherein the user input data comprises coordinate information indicating a position where the user input is detected on the popup menu or indicates a command corresponding to the user input.

13. The portable electronic device of claim 11, wherein the at least one processor is further configured to obtain screen information corresponding to the display shape, the display size, and the display resolution of the sub device, from at least one of the sub device or a network entity.

14. A sub device for displaying a popup menu that is displayable on a portable electronic device, the sub device comprising:
a display screen;
a transceiver configured to:
receive, from the portable electronic device, configuration information corresponding to a popup menu provided in an application that is being executed on the portable electronic device, and
transmit user input data corresponding to a user input detected on the popup menu displayed on the display screen of the sub device to the portable electronic device; and
at least one processor configured to:
display the popup menu on the display screen based on the configuration information, and
generate the user input data corresponding to the detected user input if detecting the user input on the popup menu displayed on the display screen,
wherein the user interface configuration information is configured by the portable electronic device according to at least one of a display shape, a display size, or a display resolution of the sub device before transmitting to the sub device, and
wherein the application is an image editing application, and the popup menu comprises at least one of a brush setting menu generated by the image editing application that is being executed on the portable electronic device.

15. The sub device of claim 14, wherein the user input data comprises coordinate information indicating a position where the user input is detected on the popup menu or indicates a command corresponding to the user input.

16. The sub device of claim 14, wherein the transceiver is further configured to transmit information corresponding to the display shape, the display size, and the display resolution of the sub device to the portable electronic device.

* * * * *